United States Patent
Huang et al.

(10) Patent No.: US 12,273,283 B2
(45) Date of Patent: Apr. 8, 2025

(54) PACKET FORWARDING METHOD, COMPUTER DEVICE, AND INTERMEDIATE DEVICE

(71) Applicant: Huawei Technologies Co., Ltd., Shenzhen (CN)

(72) Inventors: Lei Huang, Hangzhou (CN); Tao Li, Hangzhou (CN); Rongyu Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 494 days.

(21) Appl. No.: 17/683,600

(22) Filed: Mar. 1, 2022

(65) Prior Publication Data

US 2022/0191153 A1 Jun. 16, 2022

Related U.S. Application Data

(63) Continuation of application No. PCT/CN2020/097546, filed on Jun. 22, 2020.

(30) Foreign Application Priority Data

Sep. 3, 2019 (CN) .......................... 201910829444.9
Oct. 31, 2019 (CN) .......................... 201911049781.2

(51) Int. Cl.
*H04L 49/00* (2022.01)

(52) U.S. Cl.
CPC .............. *H04L 49/30* (2013.01); *H04L 49/70* (2013.01)

(58) Field of Classification Search
CPC ..... H04L 49/30; H04L 49/70; H04L 61/5038; H04L 67/56; G06F 9/5077; G06F 2209/5011; G06F 2209/509
See application file for complete search history.

(56) References Cited

U.S. PATENT DOCUMENTS 10,191,864 B1 * 1/2019 Bshara .................. G06F 13/105
10,191,865 B1 * 1/2019 Machulsky ............. G06F 13/16
(Continued)

FOREIGN PATENT DOCUMENTS

| CN | 107113240 A | 8/2017 |
|----|-------------|--------|
| CN | 107436850 A | 12/2017 |

(Continued)

OTHER PUBLICATIONS

Fan Hongwei et al.,"Data Packet Processing Acceleration Architecture for Virtual Network Function Based on FPGA," Computer Engineering, vol. 44, No. 8, Aug. 2018, with an English abstract, 9 pages.

*Primary Examiner* — Sisley N Kim
(74) *Attorney, Agent, or Firm* — Conley Rose, P.C.

(57) ABSTRACT

An intermediate device in a computer device includes a first agent unit supporting single-root input/output (I/O) virtualization (SR-IOV) and a second agent unit supporting Virtio, and the first agent unit and the second agent unit each are an agent of a function unit in a network adapter such that, a virtual machine in the computer device may use an SR-IOV technology or a Virtio technology, and does not configure two sets of independent resource pools to separately support corresponding virtualization technologies, to implement normalization of the resource pools. In addition, the intermediate device implements hardware offloading of Virtio protocol packet forwarding using hardware.

20 Claims, 21 Drawing Sheets

(56) References Cited

U.S. PATENT DOCUMENTS

| | | |
|---|---|---|
| 2018/0225246 A1 | 8/2018 | Su |
| 2018/0309595 A1 | 10/2018 | Ma |
| 2019/0012193 A1* | 1/2019 | van Leeuwen ..... G06F 9/45558 |
| 2019/0108106 A1 | 4/2019 | Aggarwal et al. |
| 2019/0114197 A1* | 4/2019 | Gong .................. G06F 9/45558 |
| 2021/0117229 A1* | 4/2021 | Kraemer ................... G06F 9/48 |
| 2021/0165750 A1 | 6/2021 | Li et al. |
| 2022/0191153 A1 | 6/2022 | Huang et al. |

FOREIGN PATENT DOCUMENTS

| | | |
|---|---|---|
| CN | 109739618 A | 5/2019 |
| CN | 109992405 A | 7/2019 |
| CN | 110688237 A | 1/2020 |
| CN | 110955517 A | 4/2020 |

\* cited by examiner

| Sequence number | Function | BDF |
|---|---|---|
| 0 | PF0 | BDF0 |
| 1 | VF0 | BDF1 |
| 2 | VF1 | BDF2 |
| 3 | VF2 | BDF3 |
| 4 | VF3 | BDF4 |
| 5 | VF4 | BDF5 |
| 6 | VF5 | BDF6 |
| 7 | VF6 | BDF7 |
| … | … | … |
| … | … | … |
| 62 | VF61 | BDF61 |
| 63 | VF62 | BDF62 |
| 64 | VF63 | BDF63 |

FIG. 4B

| Sequence number | BarRange | BarBaseAddr | BarAddrMax |
|---|---|---|---|
| 0 | PF0Bar0Range | PF0Bar0Min | PF0Bar0Max |
| 1 | VF0Bar0Range | VF0Bar0Min | VF0Bar0Max |
| 2 | VF1Bar0Range | VF1Bar0Min | VF1Bar0Max |
| 3 | VF2Bar0Range | VF2Bar0Min | VF2Bar0Max |
| 4 | VF3Bar0Range | VF3Bar0Min | VF3Bar0Max |
| 5 | VF4Bar0Range | VF4Bar0Min | VF4Bar0Max |
| 6 | VF5Bar0Range | VF5Bar0Min | VF5Bar0Max |
| 7 | VF6Bar0Range | VF6Bar0Min | VF6Bar0Max |
| … | … | … | … |
| … | … | … | … |
| 62 | VF61Bar0Range | VF61Bar0Min | VF61Bar0Max |
| 63 | VF62Bar0Range | VF62Bar0Min | VF62Bar0Max |
| 64 | VF63Bar0Range | VF63Bar0Min | VF63Bar0Max |

FIG. 4C

| Sequence number | Function | BDF | BDF' | Function' |
|---|---|---|---|---|
| 0 | PF0 | BDF0 | BDF0A' | PF0A' |
| 1 | VF0 | BDF1 | BDF1A' | VF0A' |
| 2 | VF1 | BDF2 | BDF2A' | VF1A' |
| 3 | VF2 | BDF3 | BDF3A' | VF2A' |
| 4 | VF3 | BDF4 | BDF4A' | VF3A' |
| 5 | VF4 | BDF5 | BDF5A' | VF4A' |
| 6 | VF5 | BDF6 | BDF6A' | VF5A' |
| 7 | VF6 | BDF7 | BDF7A' | VF6A' |
| ... | ... | ... | ... | ... |
| ... | ... | ... | ... | ... |
| 62 | VF61 | BDF61 | BDF61A' | VF61A' |
| 63 | VF62 | BDF62 | BDF62A' | VF62A' |
| 64 | VF63 | BDF63 | BDF63A' | VF63A' |

FIG. 4D

| Sequence number | BarRange | BarBaseAddr | BarAddrMax | BarBaseAddr' | BarAddrMax' |
|---|---|---|---|---|---|
| 0 | PF0Bar0Range | PF0Bar0Min | PF0Bar0Max | PF0ABar0Min' | PF0ABar0Max' |
| 1 | VF0Bar0Range | VF0Bar0Min | VF0Bar0Max | VF0ABar0Min' | VF0ABar0Max' |
| 2 | VF1Bar0Range | VF1Bar0Min | VF1Bar0Max | VF1ABar0Min' | VF1ABar0Max' |
| 3 | VF2Bar0Range | VF2Bar0Min | VF2Bar0Max | VF2ABar0Min' | VF2ABar0Max' |
| 4 | VF3Bar0Range | VF3Bar0Min | VF3Bar0Max | VF3ABar0Min' | VF3ABar0Max' |
| 5 | VF4Bar0Range | VF4Bar0Min | VF4Bar0Max | VF4ABar0Min' | VF4ABar0Max' |
| 6 | VF5Bar0Range | VF5Bar0Min | VF5Bar0Max | VF5ABar0Min' | VF5ABar0Max' |
| 7 | VF6Bar0Range | VF6Bar0Min | VF6Bar0Max | VF6ABar0Min' | VF6ABar0Max' |
| ... | ... | ... | ... | ... | ... |
| ... | ... | ... | ... | ... | ... |
| 62 | VF61Bar0Range | VF61Bar0Min | VF61Bar0Max | VF61ABar0Min' | VF61ABar0Max' |
| 63 | VF62Bar0Range | VF62Bar0Min | VF62Bar0Max | VF62ABar0Min' | VF62ABar0Max' |
| 64 | VF63Bar0Range | VF63Bar0Min | VF63Bar0Max | VF63ABar0Min' | VF63ABar0Max' |

FIG. 4E

| Sequence number | Function | BDF | BDF' | Function' |
|---|---|---|---|---|
| 0 | PF0 | BDF0 | BDF0B' | PF0B' |
| 1 | VF0 | BDF1 | BDF1B' | VF0B' |
| 2 | VF1 | BDF2 | BDF2B' | VF1B' |
| 3 | VF2 | BDF3 | BDF3B' | VF2B' |
| 4 | VF3 | BDF4 | BDF4B' | VF3B' |
| 5 | VF4 | BDF5 | BDF5B' | VF4B' |
| 6 | VF5 | BDF6 | BDF6B' | VF5B' |
| 7 | VF6 | BDF7 | BDF7B' | VF6B' |
| ... | ... | ... | ... | ... |
| ... | ... | ... | ... | ... |
| 62 | VF61 | BDF61 | BDF61B' | VF61B' |
| 63 | VF62 | BDF62 | BDF62B' | VF62B' |
| 64 | VF63 | BDF63 | BDF63B' | VF63B' |

FIG. 4F

| Sequence number | BarRange | BarBaseAddr | BarAddrMax | BarBaseAddr' | BarAddrMax' |
|---|---|---|---|---|---|
| 0 | PF0Bar0Range | PF0Bar0Min | PF0Bar0Max | PF0BBar0Min' | PF0BBar0Max' |
| 1 | VF0Bar0Range | VF0Bar0Min | VF0Bar0Max | VF0BBar0Min' | VF0BBar0Max' |
| 2 | VF1Bar0Range | VF1Bar0Min | VF1Bar0Max | VF1BBar0Min' | VF1BBar0Max' |
| 3 | VF2Bar0Range | VF2Bar0Min | VF2Bar0Max | VF2BBar0Min' | VF2BBar0Max' |
| 4 | VF3Bar0Range | VF3Bar0Min | VF3Bar0Max | VF3BBar0Min' | VF3BBar0Max' |
| 5 | VF4Bar0Range | VF4Bar0Min | VF4Bar0Max | VF4BBar0Min' | VF4BBar0Max' |
| 6 | VF5Bar0Range | VF5Bar0Min | VF5Bar0Max | VF5BBar0Min' | VF5BBar0Max' |
| 7 | VF6Bar0Range | VF6Bar0Min | VF6Bar0Max | VF6BBar0Min' | VF6BBar0Max' |
| ... | ... | ... | ... | ... | ... |
| ... | ... | ... | ... | ... | ... |
| 62 | VF61Bar0Range | VF61Bar0Min | VF61Bar0Max | VF61BBar0Min' | VF61BBar0Max' |
| 63 | VF62Bar0Range | VF62Bar0Min | VF62Bar0Max | VF62BBar0Min' | VF62BBar0Max' |
| 64 | VF63Bar0Range | VF63Bar0Min | VF63Bar0Max | VF63BBar0Min' | VF63BBar0Max' |

FIG. 4G

PACKET FORWARDING METHOD, COMPUTER DEVICE, AND INTERMEDIATE DEVICE

CROSS-REFERENCE TO RELATED APPLICATIONS

This is a continuation of International Patent Application No. PCT/CN2020/097546 filed on Jun. 22, 2020, which claims priority to Chinese Patent Application No. 201911049781.2 filed on Oct. 31, 2019 and Chinese Patent Application No. 201910829444.9 filed on Sep. 3, 2019. All of the aforementioned applications are hereby incorporated by reference in their entireties.

TECHNICAL FIELD

This application relates to the field of information technologies, and in particular, to a packet forwarding method, a computer device, and an intermediate device.

BACKGROUND

With the advent of multi-core processors, virtualization technologies, distributed storage technologies, and the like, a new computing mode has emerged: cloud computing. Cloud computing is a network-based, configurable, and shared computing resource pool. Therefore, the virtualization technology has become an important technical feature of the cloud computing. Virtualization includes resource virtualization and application virtualization.

In cloud computing, a specification of a virtual machine is determined from a plurality of dimensions such as an overcommitment ratio setting, a central processing unit (CPU)/memory ratio, CPU selection, a memory configuration, a local disk configuration, and a heterogeneous scenario. Based on requirements of different dimensions, various resource pools may be created through arrangement and combination, and the resource pools may be invoked based on customer requirements to provide services for customers. Each resource pool reserves a part of resources for capacity expansion of the customers. Excessive resource pools result in a waste of investment and complex operation and maintenance management of the resource pools. Therefore, normalization of the resource pools is a development trend of the cloud computing technology.

In a cloud network, intelligent network interface cards are increasingly widely used. The intelligent network interface card can assist a CPU of a server in processing network load, and offload network virtualization, load balancing, and some management functions from the CPU of the server, so that the CPU of the server provides a higher processing capability for application of virtual machines.

There are two mainstream virtualization technologies for the intelligent network interface card: a Virtio technology and a single-root input/output (I/O) virtualization (SR-IOV) technology. By using the SR-IOV technology, the intelligent network interface card may virtualize a plurality of virtual functions through Peripheral Component Interconnect Express (PCIe) extended configuration space and show these virtual functions to the virtual machine in a direct communication manner. This has features of high performance and rich functions. However, disadvantages are obvious. For example, live migration is inconvenient, and virtual function interfaces provided by different vendors are inconsistent, so that additional drivers are required. By using the Virtio technology that serves as a common virtualization interface in the industry, the foregoing problems may be resolved. However, the Virtio technology is implemented in a software simulation manner currently. Consequently, network performance is poor.

SUMMARY

Embodiments of this application provide a packet forwarding method, a computer device, and an intermediate device, to improve I/O performance and resource utilization of a device.

According to a first aspect, an embodiment of this application provides a computer device. The computer device includes a first CPU, an intermediate device, a network adapter, and a bus. The intermediate device is connected to both the first CPU and the network adapter through the bus. The first CPU supports running a first virtual machine. The network adapter includes a plurality of function units generated based on a virtualization technology.

The first CPU is configured to obtain, by enumerating the intermediate device, information about a first agent unit supporting SR-IOV and information about a second agent unit supporting Virtio in the intermediate device, and separately allocate address information to the first agent unit and the second agent unit. The first agent unit is an agent of a first function unit in the network adapter, the second agent unit is an agent of a second function unit in the network adapter, and the first function unit and the second function unit are a same function unit or different function units in the network adapter.

The intermediate device is configured to allocate address information to the first function unit and the second function unit in the network adapter by enumerating the network adapter, establish a correspondence between the address information of the first agent unit and the address information of the first function unit, and establish a correspondence between the address information of the second agent unit and the address information of the second function unit. When the first virtual machine uses an SR-IOV technology, the intermediate device is configured to implement packet forwarding between the first virtual machine and the network adapter according to the correspondence between the address information of the first agent unit and the address information of the first function unit, or when the first virtual machine uses a Virtio technology, the intermediate device is configured to implement packet forwarding between the first virtual machine and the network adapter according to the correspondence between the address information of the second agent unit and the address information of the second function unit.

The intermediate device in the computer device may include the first agent unit supporting SR-IOV and the second agent unit supporting Virtio, the first agent unit is the agent of the first function unit, the second agent unit is the agent of the second function unit, and the first function unit and the second function unit are the same function unit or different function units in the network adapter. In this way, the first virtual machine may use the SR-IOV technology or the Virtio technology, and there is no need to configure two sets of independent resource pools to separately support corresponding virtualization technologies, to implement normalization of resource pools. In addition, the intermediate device is connected to both the first CPU and the network adapter through the bus, to implement hardware offloading of Virtio protocol packet forwarding, so that not only forwarding performance is better than that in a forwarding manner implemented by using software, but also occupied resources of the first CPU may be reduced, and resource utilization of the first CPU may be improved.

Optionally, the intermediate device may be implemented by a device, for example, a field-programmable gate array (FPGA), an application-specific integrated circuit (ASIC), or an FPGA+ASIC.

Optionally, a packet includes a data packet or a command packet. The data packet includes but is not limited to data to be read or written, and the command packet includes but is not limited to a control command or a control message to be sent.

Optionally, the bus may be a PCIe bus or an Ultra Path Interconnect (UPI) bus. When the bus is a PCIe bus, the intermediate device serves as a root node of the PCIe, discovers the network adapter through PCIe enumeration, and obtains information about the function units in the network adapter. The function units are configured to implement functions of the network adapter, and the function units may include a physical function (PF) or a virtual function (VF).

Optionally, the first function unit or the second function unit is one of the plurality of function units that are included in the network adapter and that are generated based on the virtualization technology.

Optionally, the first function unit and the second function unit may be a same VF or different VFs in the network adapter. Alternatively, the first function unit and the second function unit may be a same PF or different PFs in the network adapter.

Optionally, that the first agent unit supporting SR-IOV is the agent of the first function unit means that the first agent unit is a unit that is in the intermediate device and that serves as an agent for a function of the first function unit. For example, when the first function unit is a PF, the first agent unit is an agent unit of the PF, or when the first function unit is a VF, the first agent unit is an agent unit of the VF.

Optionally, that the second agent unit supporting Virtio is the agent of the second function unit means that the second agent unit is a unit that is in the intermediate device and that serves as an agent for a function of the second function unit. For example, when the second function unit is a PF, the second agent unit is an agent unit of the PF, or when the second function unit is a VF, the second agent unit is an agent unit of the VF.

Optionally, the first agent unit supporting SR-IOV is one of a plurality of agent units included in the intermediate device, and the first agent unit is configured to implement a function of a network adapter supporting SR-IOV. The information about the first agent unit is information used to identify the first agent unit. The information used to identify the first agent unit may be stored in a register of a first sub-endpoint port of the intermediate device. When the first CPU enumerates the intermediate device through PCIe, the first CPU obtains the information about the first agent unit by obtaining the information in the register of the first sub-endpoint port. Optionally, information about a PFA' serving as an agent unit is stored in the register of the first sub-endpoint port.

Optionally, the second agent unit supporting Virtio is one of the plurality of agent units included in the intermediate device, and the second agent unit is configured to implement a function of a network adapter supporting Virtio. The information about the second agent unit is information used to identify the second agent unit. The information used to identify the second agent unit may be stored in a register of a second sub-endpoint port of the intermediate device. When the first CPU enumerates the intermediate device through PCIe, the first CPU obtains the information about the second agent unit by obtaining the information in the register of the second sub-endpoint port. Optionally, information about a PFB' serving as an agent unit is stored in the register of the second sub-endpoint port.

Optionally, the intermediate device is further configured to store the correspondence between the address information of the first agent unit and the address information of the first function unit, and store the correspondence between the address information of the second agent unit and the address information of the second function unit.

When the bus is a PCIe bus, the first CPU serves as a root node of the PCIe, discovers the intermediate device through PCIe enumeration, and obtains the information about the first agent unit and the information about the second agent unit in the intermediate device. After discovering the information about the first agent unit in the intermediate device through PCIe enumeration, the first CPU allocates the address information to the discovered first agent unit. The allocated address information includes but is not limited to a Bus, Device, and Function (BDF) and base address register (BAR) space address information. In addition, after discovering the information about the second agent unit in the intermediate device through PCIe enumeration, the first CPU allocates the address information to the discovered second agent unit. The allocated address information includes but is not limited to the BDF and the BAR space address information.

Optionally, the first virtual machine may be configured to use the SR-IOV technology, or may be configured to use the Virtio technology. A virtualization technology configured for the first virtual machine may be configured by a function unit (for example, a virtual machine manager) in the computer device according to a received configuration instruction of a user. It may be understood that, at a same moment, the first virtual machine supports only one virtualization technology. In a possible design, the intermediate device includes a first endpoint port, the intermediate device is connected to the first CPU through the first endpoint port, the first endpoint port includes a first switching device, the first sub-endpoint port, and the second sub-endpoint port, and the first sub-endpoint port and the second sub-endpoint port each are connected to a downlink port of the first switching device.

The first CPU is further configured to obtain information about the first switching device through enumeration, obtain the information about the first agent unit by enumerating the first sub-endpoint port, and obtain the information about the second agent unit by enumerating the second sub-endpoint port.

Optionally, the first switching device may be a PCIe switch. The address information that is of the first agent unit and that is allocated by the first CPU through enumeration and the address information that is of the second agent unit and that is allocated by the first CPU through enumeration are recorded in configuration space of the PCIe switch. In this way, the PCIe switch can forward, based on the recorded address information, packets sent and received by the first virtual machine.

In a possible design, the first switching device is configured to receive a first packet sent by the first virtual machine, and select, based on address information in the first packet, one of the first sub-endpoint port and the second sub-endpoint port to forward the first packet.

In a possible design, the intermediate device further includes a channel control module.

The channel control module is configured to control a forwarding path when the network adapter sends a second packet to the first virtual machine.

When the first virtual machine uses the SR-IOV technology, the channel control module determines a path including the first sub-endpoint port as a path for forwarding the second packet, or when the first virtual machine uses the Virtio technology, the channel control module determines a path including the second sub-endpoint port as a path for forwarding the second packet.

Optionally, the channel control module may be implemented by using a channel control register. The channel control register may be a register in BAR space of the intermediate device, for example, may be a register in BAR space of the first sub-endpoint port, or may be a register in BAR space of the second sub-endpoint port.

In a possible design, the switching device further includes a conversion module.

The conversion module is configured to convert a packet sent by the first virtual machine using the Virtio technology into a packet of a forwarding protocol between the intermediate device and the network adapter, or convert a packet sent by the network adapter to the first virtual machine using the Virtio technology into a packet supporting a Virtio protocol.

Optionally, the packet of the forwarding protocol between the intermediate device and the network adapter may be a packet of a common direct memory access (DMA) command, or may be a packet of a non-volatile memory express (NVMe).

The conversion module in the intermediate device can implement hardware offloading of Virtio protocol packet forwarding, so that not only forwarding performance is better than that in a forwarding manner implemented by using software, but also occupied CPU resources may be reduced, and CPU resource utilization may be improved.

In a possible design, the computer device further includes a second CPU, and the second CPU supports running a second virtual machine.

The second CPU is connected to both the first CPU and the intermediate device through the bus.

The second CPU is configured to obtain, by enumerating the intermediate device, information about a third agent unit supporting SR-IOV and information about a fourth agent unit supporting Virtio in the intermediate device, and separately allocate address information to the third agent unit and the fourth agent unit. The third agent unit is an agent of a third function unit in the network adapter, the fourth agent unit is an agent of a fourth function unit in the network adapter, and the third function unit and the fourth function unit are a same function unit or different function units in the network adapter.

The intermediate device is further configured to allocate address information to the third function unit and the fourth function unit in the network adapter, establish a correspondence between the address information of the third agent unit and the address information of the third function unit, and establish a correspondence between the address information of the fourth agent unit and the address information of the fourth function unit.

When the second virtual machine uses the SR-IOV technology, the intermediate device is configured to implement packet forwarding between the second virtual machine and the network adapter according to the correspondence between the address information of the third agent unit and the address information of the third function unit, or when the second virtual machine uses the Virtio technology, the intermediate device is configured to implement packet forwarding between the second virtual machine and the network adapter according to the correspondence between the address information of the fourth agent unit and the address information of the fourth function unit.

In this way, the second virtual machine may use the SR-IOV technology, and may also use the Virtio technology, so that not only normalization of resource pools is implemented, but also hardware offload of Virtio protocol packet forwarding is implemented, and occupied resources of the first CPU may be reduced, and resource utilization of the second CPU may be improved.

Optionally, the first CPU and the second CPU share the network adapter. That the first CPU and the second CPU share the network adapter is that the first CPU and the second CPU each are communicatively connected to a network via the network adapter.

In a possible design, the intermediate device is further configured to configure the information about the first agent unit in the first sub-endpoint port based on the information about the first function unit, and configure the information about the second agent unit in the second sub-endpoint port based on the information about the second function unit.

Optionally, the information about the first agent unit in the first sub-endpoint port and the information about the second agent unit in the second sub-endpoint port may be configured by the intermediate device during manufacturing, or may be configured by the controller in the first sub-endpoint port and the second sub-endpoint port after the controller obtains information about a PF and information about a VF in the network adapter. When information to identify a PFA' and that is included in the register of the first sub-endpoint port, and information used to identify a PFB' and that is included in the register of the second sub-endpoint port are configured by the controlled in the first sub-endpoint port and the second sub-endpoint port after the controller obtains the information about the PF and the information about the VF in the network adapter, the intermediate device can configure a corresponding agent unit based on a specific situation of the connected network adapter, so that a function of the intermediate device can be more flexibly implemented.

Optionally, the intermediate device is further configured to configure the information about the third agent unit in a third sub-endpoint port based on the information about the third function unit, and configure the information about the fourth agent unit in a fourth sub-endpoint port.

Optionally, the information about the third agent unit in the third sub-endpoint port and the information about the fourth agent unit in the fourth sub-endpoint port may be configured by the intermediate device during manufacturing, or may be configured by the controller in the third sub-endpoint port and the fourth sub-endpoint port after the controller obtains the information about the PF and the information about the VF in the network adapter. When information that is used to identify a PFA' and that is included in the register of the third sub-endpoint port and information that is used to identify a PFB' and that is included in the register of the fourth sub-endpoint port are configured by the controlled in the third sub-endpoint port and the fourth sub-endpoint port after the controller obtains the information about the PF and the information about the VF in the network adapter, the intermediate device can configure a corresponding agent unit based on a specific situation of the connected network adapter, so that a function of the intermediate device can be more flexibly implemented.

Optionally, after obtaining, through PCIe enumeration, the information that is used to identify the PFA' supporting SR-IOV and that is included in the register of the first endpoint port, the first CPU enables a VF Enable register in SR-My configuration space of the PFA' to configure an attribute of the VF, so as to discover a VFA'. The attribute of the VF may be configured by configuring an SR-IOV capability of the PFA' to discover the VFA' supporting SR-IOV. The PFA' and the VFA' discovered by the first CPU each may be one implementation of the first agent unit.

Optionally, after obtaining, through PCIe enumeration, the information that is used to identify the PFB' supporting Virtio and that is included in the register of the second endpoint port, the first CPU enables a VF Enable register in SR-IOV configuration space of the PFB' to configure an attribute of the VF, so as to discover a VFB' supporting Virtio. The attribute of the VF may be configured by configuring an SR-IOV capability of the PFB' to discover the VFB'. The PFA' and the VFA' discovered by the first CPU each may be one implementation of the second agent unit.

Optionally, during PCIe enumeration, the first CPU allocates a BDF to a corresponding PF'/VF' based on a location of an obtained PF'/VF' in a PCIe topology, that is, allocates a corresponding BDF to a discovered agent unit.

Optionally, the first CPU obtains a BAR space size of the agent unit (a PF' or a VF') through enumeration, and configures a start address and an address length of a BAR space address, to configure BAR space address information of the agent unit.

Optionally, the first CPU may further send obtained address information of the agent unit, including but not limited to a BDF and BAR space address information of the first agent unit, and a BDF and BAR space address information of the second agent unit, to the intermediate device by using a transaction layer packet (TLP).

In a possible design, the address information of the first function unit includes BDF information of the first function unit and BAR space address information of the first function unit.

The address information of the second function unit includes BDF information of the second function unit and BAR space address information of the second function unit.

The address information of the first agent unit includes BDF information of the first agent unit and BAR space address information of the first agent unit.

The address information of the second agent unit includes BDF information of the second agent unit and BAR space address information of the second agent unit.

In a possible design, the network adapter supports an SR-IOV function, and the first function unit includes a first physical function or a first virtual function.

According to a second aspect, an embodiment of this application provides an intermediate device. The intermediate device is connected to both a first CPU and a network adapter in a computer device through a bus, the first CPU supports running a first virtual machine, and the intermediate device includes a controller and a memory.

The controller is configured to obtain information about a first function unit and information about a second function unit in the network adapter, separately allocate addresses to the first function unit and the second function unit, obtain address information of a first agent unit and address information of a second agent unit, and establish a correspondence between the address information of the first agent unit and address information of the first function unit and a correspondence between the address information of the second agent unit and address information of the second function unit. The first function unit and the second function unit are a same function unit or different function units generated based on a virtualization technology in the network adapter, the first agent unit supports an SR-IOV technology and is an agent of the first function unit, and the second agent unit supports a Virtio technology and is an agent of the second function unit.

The memory is configured to store the correspondence between the address information of the first agent unit and the address information of the first function unit and the correspondence between the address information of the second agent unit and the address information of the second function unit.

The controller is further configured to, when the first virtual machine uses the SR-IOV technology, implement packet forwarding between the first virtual machine and the network adapter according to the correspondence between the address information of the first agent unit and the address information of the first function unit, or when the first virtual machine uses the Virtio technology, implement packet forwarding between the first virtual machine and the network adapter according to the correspondence between the address information of the second agent unit and the address information of the second function unit.

The intermediate device may include the first agent unit supporting SR-IOV and the second agent unit supporting Virtio, the first agent unit is the agent of the first function unit, the second agent unit is the agent of the second function unit, and the first function unit and the second function unit are the same function unit or different function units in the network adapter. In this way, the intermediate device may forward packets sent and received by a virtual machine that uses the SR-IOV technology, and may also forward packets sent and received by a virtual machine that uses the Virtio technology, to implement normalization of resource pools. In addition, the intermediate device is connected to both the first CPU and the network adapter in the computer device through the bus, to implement hardware offloading of Virtio protocol packet forwarding, so that not only forwarding performance is better than that in a forwarding manner implemented by using software, but also occupied CPU resources may be reduced, and CPU resource utilization may be improved.

Optionally, the intermediate device may be implemented by a device, for example, an FPGA, an ASIC, or an FPGA+ASIC.

Optionally, the packet includes a data packet or a command packet. The data packet includes but is not limited to data to be read or written, and the command packet includes but is not limited to a control command or a control message to be sent.

Optionally, the first function unit is one of a plurality of function units that are included in the network adapter and that are generated based on the virtualization technology.

Optionally, that the first agent unit supporting SR-IOV is the agent of the first function unit means that the first agent unit is a unit that is in the intermediate device and that serves as an agent for a function of the first function unit. For example, when the first function unit is a PF, the first agent unit is an agent unit of the PF, or when the first function unit is a VF, the first agent unit is an agent unit of the VF.

Optionally, that the second agent unit supporting Virtio is the agent of the second function unit means that the second agent unit is a unit that is in the intermediate device and that serves as an agent for a function of the second function unit. For example, when the second function unit is a PF, the second agent unit is an agent unit of the PF, or when the second function unit is a VF, the second agent unit is an agent unit of the VF.

Optionally, the first agent unit supporting SR-IOV is one of a plurality of agent units included in the intermediate device, and the first agent unit is configured to implement a function of a network adapter supporting SR-IOV. The information about the first agent unit is information used to identify the first agent unit. The information used to identify the first agent unit may be stored in a register of a first sub-endpoint port of the intermediate device. When the first CPU enumerates the intermediate device through PCIe, the first CPU obtains the information about the first agent unit by obtaining the information in the register of the first sub-endpoint port. Optionally, information about a PFA' serving as an agent unit is stored in the register of the first sub-endpoint port.

Optionally, the second agent unit supporting Virtio is one of the plurality of agent units included in the intermediate device, and the second agent unit is configured to implement a function of a network adapter supporting Virtio. The information about the second agent unit is information used to identify the second agent unit. The information used to identify the second agent unit may be stored in a register of a second sub-endpoint port of the intermediate device. When the first CPU enumerates the intermediate device through PCIe, the first CPU obtains the information about the first agent unit by obtaining the information in the register of the second sub-endpoint port. Optionally, information about a PFB' serving as an agent unit is stored in the register of the second sub-endpoint port.

Optionally, the intermediate device is further configured to store the correspondence between the address information of the first agent unit and the address information of the first function unit, and store the correspondence between the address information of the second agent unit and the address information of the second function unit.

In a possible design, the intermediate device includes a first endpoint port, the intermediate device is connected to the first CPU through the first endpoint port, the first endpoint port includes a first switching device, the first sub-endpoint port, and the second sub-endpoint port, and the first sub-endpoint port and the second sub-endpoint port each are connected to a downlink port of the first switching device.

The first sub-endpoint port includes the information about the first agent unit, and the second sub-endpoint port includes the information about the second agent unit.

Optionally, the first switching device may be a PCIe switch. The address information that is of the first agent unit and that is allocated by the first CPU through enumeration and the address information that is of the second agent unit and that is allocated by the first CPU through enumeration are recorded in configuration space of the PCIe switch. In this way, the PCIe switch can forward, based on the recorded address information, packets sent and received by the first virtual machine.

In a possible design, the first switching device is configured to receive a first packet sent by the first virtual machine, and select, based on address information in the first packet, one of the first sub-endpoint port and the second sub-endpoint port to forward the first packet.

In a possible design, the intermediate device further includes a channel control module.

The channel control module is configured to control a forwarding path when the network adapter sends a second packet to the first virtual machine.

When the first virtual machine uses the SR-IOV technology, the channel control module determines a path including the first sub-endpoint port as a path for forwarding the second packet, or when the first virtual machine uses the Virtio technology, the channel control module determines a path including the second sub-endpoint port as a path for forwarding the second packet.

Optionally, the channel control module may be implemented by using a channel control register. The channel control register may be a register in BAR space of the intermediate device, for example, may be a register in BAR space of the first sub-endpoint port, or may be a register in BAR space of the second sub-endpoint port.

In a possible design, the switching device further includes a conversion module.

The conversion module is configured to convert a packet sent by the first virtual machine using the Virtio technology into a packet of a forwarding protocol between the intermediate device and the network adapter, or convert a packet sent by the network adapter to the first virtual machine using the Virtio technology into a packet supporting a Virtio protocol.

Optionally, the packet of the forwarding protocol between the intermediate device and the network adapter may be a packet of a common DMA command, or may be an NVMe packet.

In a possible design, the intermediate device is further configured to configure the information about the first agent unit in the first sub-endpoint port based on the information about the first function unit, and configure the information about the second agent unit in the second sub-endpoint port based on the information about the second function unit.

In a possible design, the address information of the first function unit includes BDF information of the first function unit and BAR space address information of the first function unit.

The address information of the second function unit includes BDF information of the second function unit and BAR space address information of the second function unit.

The address information of the first agent unit includes BDF information of the first agent unit and BAR space address information of the first agent unit.

The address information of the second agent unit includes BDF information of the second agent unit and BAR space address information of the second agent unit.

Optionally, the intermediate device is further connected to both a second CPU and the network adapter in the computer device through the bus, and the second CPU supports running a second virtual machine.

The controller is further configured to obtain information about a third function unit and information about a fourth function unit in the network adapter, separately allocate addresses to the third function unit and the fourth function unit, obtain address information of a third agent unit and address information of a fourth agent unit, and establish a correspondence between the address information of the third agent unit and address information of the third function unit and a correspondence between the address information of the fourth agent unit and address information of the fourth function unit. The third function unit and the fourth function unit are a same function unit or different function units generated based on a virtualization technology in the network adapter, the third agent unit supports the SR-IOV technology and is an agent of the first function unit, and the fourth agent unit supports the Virtio technology and is an agent of the second function unit.

The memory is configured to store the correspondence between the address information of the third agent unit and the address information of the third function unit and the correspondence between the address information of the fourth agent unit and the address information of the fourth function unit.

The controller is further configured to when the second virtual machine uses the SR-IOV technology, implement packet forwarding between the second virtual machine and the network adapter according to the correspondence between the address information of the third agent unit and the address information of the third function unit, or when the second virtual machine uses the Virtio technology, implement packet forwarding between the second virtual machine and the network adapter according to the correspondence between the address information of the fourth agent unit and the address information of the fourth function unit.

In this way, the second virtual machine may use the SR-IOV technology, and may also use the Virtio technology, so that not only normalization of resource pools is implemented, but also hardware offload of Virtio protocol packet forwarding is implemented, and occupied resources of the first CPU may be reduced, and resource utilization of the second CPU may be improved.

According to a third aspect, an embodiment of this application provides a packet forwarding method. The method includes the following steps obtaining information about a first function unit and information about a second function unit in a network adapter, separately allocating addresses to the first function unit and the second function unit, obtaining address information of a first agent unit and address information of a second agent unit, and establishing a correspondence between the address information of the first agent unit and address information of the first function unit and a correspondence between the address information of the second agent unit and address information of the second function unit, where the first function unit and the second function unit are a same function unit or different function units generated based on a virtualization technology in the network adapter, the first agent unit supports an SR-IOV technology and is an agent of the first function unit, the second agent unit supports a Virtio technology and is an agent of the second function unit, and the network adapter is a device for implementing packet forwarding between a virtual machine and a network, and when the virtual machine uses the SR-IOV technology, implementing packet forwarding between the virtual machine and the network adapter according to the correspondence between the address information of the first agent unit and the address information of the first function unit, or when the virtual machine uses the Virtio technology, implementing packet forwarding between the virtual machine and the network adapter according to the correspondence between the address information of the second agent unit and the address information of the second function unit.

In the foregoing method, the virtual machine may use the SR-IOV technology or the Virtio technology, and there is no need to configure two sets of independent resource pools to separately support corresponding virtualization technologies, to implement normalization of resource pools. In addition, packet forwarding between the virtual machine and the network adapter may be implemented by using hardware, so that hardware offloading of Virtio protocol packet forwarding can be implemented, not only forwarding performance is better than that in a forwarding manner implemented by using software, but also occupied CPU resources may be reduced, and CPU resource utilization may be improved.

Optionally, a packet includes a data packet or a command packet. The data packet includes but is not limited to data to be read or written, and the command packet includes but is not limited to a control command or a control message to be sent.

Optionally, the first function unit or the second function unit is one of a plurality of function units that are included in the network adapter and that are generated based on a virtualization technology.

Optionally, that the first agent unit supporting SR-IOV is the agent of the first function unit means that the first agent unit is a unit that is in the intermediate device and that serves as an agent for a function of the first function unit. For example, when the first function unit is a PF, the first agent unit is an agent unit of the PF, or when the first function unit is a VF, the first agent unit is an agent unit of the VF.

Optionally, that the second agent unit supporting Virtio is the agent of the second function unit means that the second agent unit is a unit that is in the intermediate device and that serves as an agent for a function of the second function unit. For example, when the second function unit is a PF, the second agent unit is an agent unit of the PF, or when the second function unit is a VF, the second agent unit is an agent unit of the VF.

In a possible design, obtaining information about a first function unit in a network adapter includes obtaining the information about the first function unit in the network adapter by enumerating the network adapter.

In a possible design, obtaining information about a second function unit in a network adapter includes obtaining the information about the second function unit in the network adapter by enumerating the network adapter.

In a possible design, the method further includes separately configuring information about the first agent unit and information about the second agent unit in different sub-endpoint ports based on the information about the first function unit and the information about the second function unit.

In a possible design, the address information includes BDF information and BAR space address information.

According to a fourth aspect, an embodiment of this application provides a computer device. The computer device includes a first CPU, an intermediate device, a network adapter, and a bus. The intermediate device is connected to both the first CPU and the network adapter through the bus. The first CPU supports running a first virtual machine. The first virtual machine supports an SR-IOV technology, or the first virtual machine supports a Virtio technology.

The intermediate device is configured to receive a first packet sent by the first virtual machine, and forward the first packet to the network adapter.

Alternatively, the intermediate device is configured to receive a second packet sent by the network adapter, and forward the second packet to the first virtual machine.

The first virtual machine in the computer device may use the SR-IOV technology or the Virtio technology, and there is no need to configure two sets of independent resource pools to separately support corresponding virtualization technologies, to implement normalization of resource pools. In addition, the intermediate device is connected to both the first CPU and the network adapter through the bus, to implement hardware offloading of Virtio protocol packet forwarding, so that not only forwarding performance is better than that in a forwarding manner implemented by using software, but also occupied resources of the first CPU may be reduced, and resource utilization of the first CPU may be improved.

Optionally, the intermediate device may be implemented by a device, for example, an FPGA, an ASIC, or an FPGA+ASIC.

Optionally, the packet includes a data packet or a command packet. The data packet includes but is not limited to data to be read or written, and the command packet includes but is not limited to a control command or a control message to be sent.

Optionally, the bus may be a PCIe bus or a UPI bus. When the bus is a PCIe bus, the intermediate device serves as a root node of the PCIe and discovers the network adapter through PCIe enumeration.

Optionally, the first virtual machine may be configured to use the SR-IOV technology, or may be configured to use the Virtio technology. A virtualization technology configured for the first virtual machine may be configured by a function unit (for example, a virtual machine manager) in the computer device according to a received configuration instruction of a user. It may be understood that, at a same moment, the first virtual machine supports only one virtualization technology.

In a possible design, the computer device further includes a second CPU. The intermediate device is connected to both the second CPU and the network adapter through the bus. The second CPU supports running a second virtual machine. The second virtual machine supports an SR-IOV technology, or the second virtual machine supports a Virtio technology.

The intermediate device is configured to receive a third packet sent by the second virtual machine, and forward the third packet to the network adapter.

Alternatively, the intermediate device is configured to receive a fourth packet sent by the network adapter, and forward the fourth packet to the second virtual machine.

Optionally, the first CPU and the second CPU share the network adapter. That the first CPU and the second CPU share the network adapter is that the first CPU and the second CPU each are communicatively connected to a network via the network adapter.

According to a fifth aspect, an embodiment of this application provides an intermediate device. The intermediate device is connected to both a first CPU and a network adapter in a computer device through a bus. The first CPU supports running a first virtual machine. The first virtual machine supports an SR-IOV technology, or the first virtual machine supports a Virtio technology. The intermediate device includes a controller and a memory.

The memory is configured to store an address correspondence for implementing packet forwarding.

The controller is configured to receive a first packet sent by the first virtual machine, and forward the first packet to the network adapter according to the address correspondence, or the controller is configured to receive a second packet sent by the network adapter, and forward the second packet to the first virtual machine according to the address correspondence.

In this way, the intermediate device may forward packets sent and received by a virtual machine that uses the SR-IOV technology, and may also forward packets sent and received by a virtual machine that uses the Virtio technology, to implement normalization of resource pools. In addition, the intermediate device is connected to both the first CPU and the network adapter in the computer device through the bus, to implement hardware offloading of Virtio protocol packet forwarding, so that not only forwarding performance is better than that in a forwarding manner implemented by using software, but also occupied CPU resources may be reduced, and CPU resource utilization may be improved.

Optionally, the intermediate device may be implemented by a device, for example, an FPGA, an ASIC, or an FPGA+ASIC.

An embodiment of this application further provides a computer-readable storage medium including program code. The program code includes instructions for performing some or all of the steps of any method according to the third aspect.

An embodiment of this application further provides a computer-readable storage medium. The computer-readable storage medium stores a computer program, and when the computer program is run on a computer, the computer is enabled to perform any one of the possible methods according to the third aspect.

An embodiment of this application further provides a computer program product. When the computer program product runs on a computer, the computer is enabled to perform any method according to the third aspect.

It may be understood that any one of the foregoing storage device, computer-readable storage medium, computer program product, or the like is configured to perform the corresponding method provided above. Therefore, for beneficial effects that can be achieved, refer to the beneficial effects in the corresponding method. Details are not described herein again.

BRIEF DESCRIPTION OF DRAWINGS

The following briefly describes the accompanying drawings for describing some of the embodiments. It is clear that the accompanying drawings in the following description show merely some embodiments of the present disclosure, and a person of ordinary skill in the art may derive other drawings from these accompanying drawings without creative efforts.

FIG. 4B is a schematic diagram of a BDF information recording manner according to an embodiment of this application;

FIG. 4C is a schematic diagram of a BAR space address information recording manner according to an embodiment of this application;

FIG. 4D is a schematic diagram of a BDF correspondence between a PFA' and a PF and a BDF correspondence between a VFA' and a VF according to an embodiment of this application;

FIG. 4E is a schematic diagram of a BAR space address correspondence between a PFA' and a PF and a BAR space address correspondence between a VFA' and a VF according to an embodiment of this application;

FIG. 4F is a schematic diagram of a BDF correspondence between a PFB' and a PF and a BDF correspondence between a VFB' and a VF according to an embodiment of this application;

FIG. 4G is a schematic diagram of a BAR space address correspondence between a PFB' and a PF and a BAR space address correspondence between a VFB' and a VF according to an embodiment of this application;

DESCRIPTION OF EMBODIMENTS

Figure 1:
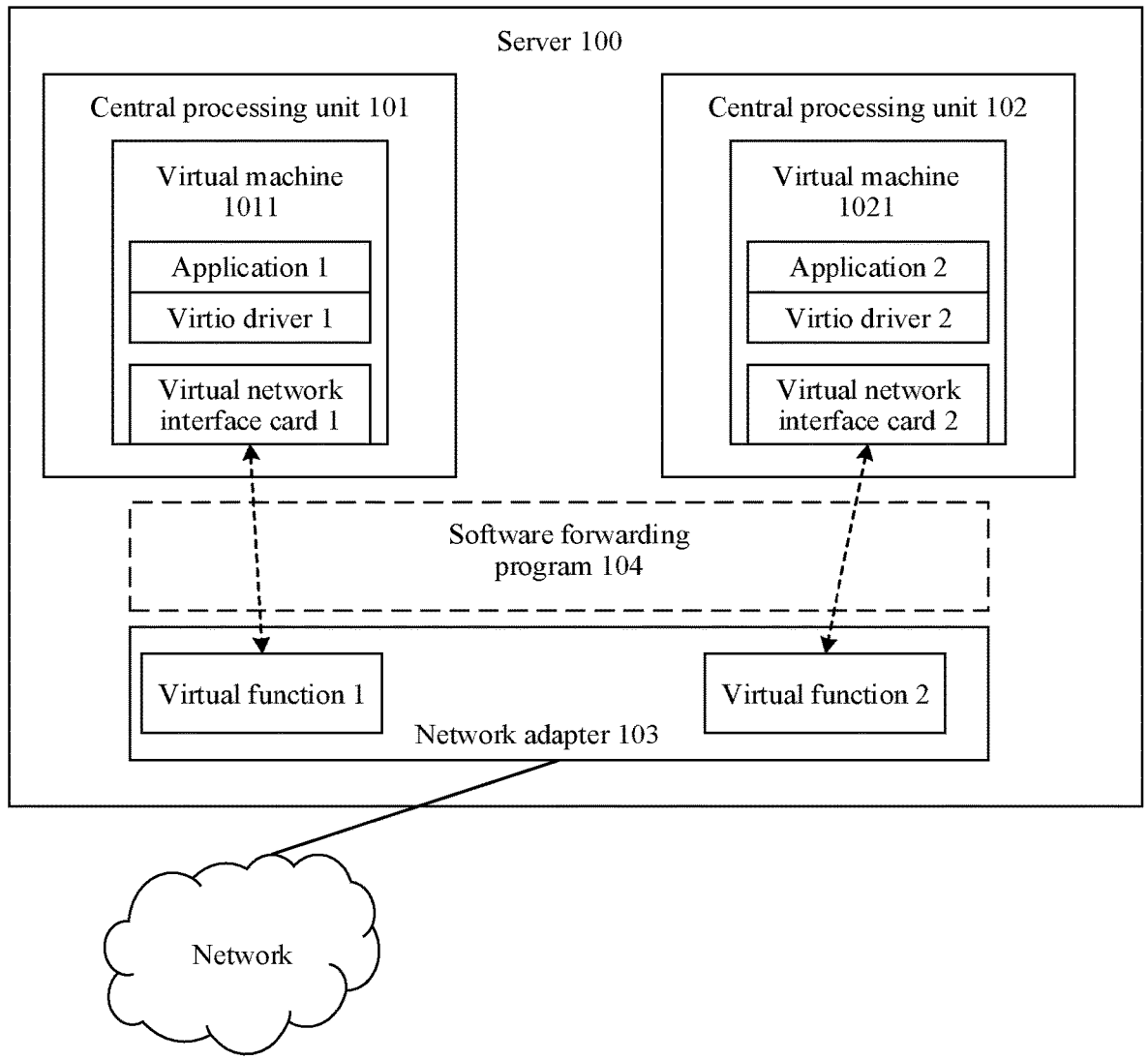
FIG. 1 is a schematic diagram of a structure of an implementation of a server according to an embodiment of this application.

The following describes embodiments of the present disclosure with reference to the accompanying drawings.

In addition, the terms "first" and "second" in the embodiments of the present disclosure are merely intended for a purpose of description, and shall not be understood as an indication or implication of relative importance or implicit indication of a quantity of indicated technical features. Therefore, a feature limited by "first" or "second" may explicitly or implicitly include one or more features.

In the embodiments of this application, "at least one" means one or more, and "a plurality of" means two or more. The term "and/or" describes an association relationship for describing associated objects and represents that three relationships may exist. For example, A and/or B may indicate the following cases: only A exists, only B exists, and both A and B exist, where A and B may be singular or plural. The character "/" usually indicates an "or" relationship between the associated objects. "At least one of the following items (pieces)" or a similar expression thereof means any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

Any embodiment or design solution described as an "example" or "for example" in this application should not be explained as being more preferred or more advantageous than another embodiment or design solution. Exactly, use of the word such as "example" or "for example" is intended to present a related concept in a specific manner.

To help a person skilled in the art better understand the technical solutions in this application, some concepts used in the embodiments of this application are first described.

Virtualization: Abstracting a resource in a form into a resource in another form is virtualization, which is essentially simulation. System virtualization is to visualize a physical computer system (host) into one or more virtual machines (VMs). Each VM has its own hardware, for example, a CPU, a memory, and various peripherals, and each VM can run its own operating system (OS) and applications. Hardware resources owned by the VM may be resources simulated by software, or may be real physical hardware.

SR-IOV technology: The SR-IOV technology is a hardware-based virtualization solution, which can improve performance and scalability. By using the SR-IOV technology, a single I/O resource can be shared by a plurality of virtual machines, and each virtual machine can access a unique I/O resource. A PCIe device that has enabled SR-IOV and that is supported by appropriate hardware and an OS may be shown as a plurality of separate physical devices, and the physical devices each have respective PCIe configuration space. Based on the technology, two function types are abstracted for use by users: a PF and a VF. The PF is a full-function PCIe function and can be discovered, managed, and processed like any other PCIe device. The PF has full-configuration resources and can be used to configure or control the PCIe device. The VF is a function associated with the PF, is a lightweight PCIe function, and can share one or more physical resources with the PF and other VFs associated with the same PF. The VF is allowed to have only configuration resources used for its own behavior. Each device implementing SR-IOV may have one or more PFs, and each PF may have a maximum of 64,000 VFs associated with it. The PF may create VFs through registers. The registers are designed with attributes specific to this purpose. Each VF has a piece of PCIe internal space for mapping its register set. A VF device driver operates the register set to enable a function of the driver, and is displayed as an actual PCIe device. Each PF or VF has a unique BDF in a PCIe bus system.

Virtio technology: Virtio is an I/O paravirtualization solution, is the lubricant for communication between a guest and a host, and provides a common framework and standard interfaces or protocols to implement interaction between the guest and the host, to greatly resolve a problem of adaption between various drivers and different virtualization solutions. The Virtio technology provides a framework and programming interfaces for communication between upper-layer applications and hypervisor virtualization devices (such as a kernel-based virtual machine (KVM), Xen, and VMware). In a full virtualization solution, if a guest VM wants to use underlying host resources, a hypervisor is required to intercept all request instructions and simulate the behavior of these instructions, which is bound to bring a lot of performance overheads. Paravirtualization implements some instructions that do not need to be virtualized by using hardware in a manner of assisting by underlying hardware. The hypervisor is responsible for virtualizing only some instructions. To achieve this, the guest is required to complete front-end drivers for different devices, and the hypervisor works with the guest to complete corresponding back-end drivers. In this way, an efficient virtualization process can be implemented through an interaction mechanism between the hypervisor and the guest. In general, Virtio may be divided into four layers, including various driver modules in a front-end guest, processor modules on a back-end hypervisor, and an intermediate Virtio layer and Virtio-ring layer that are used for front-end and back-end communication. The Virtio layer implements a virtual queue interface and can be considered as a bridge for the front-end and back-end communication. The Virtio-ring layer is specific implementation of this bridge, and implements two ring buffers to store information executed by the front-end drivers and the back-end processors separately.

BDF: a unique identifier of each function in a PCIe device. Each PCIe device may have only one function, or may have a maximum of eight functions. Regardless of how many functions a PCIe device has, each function has a unique independent configuration space. PCIe configuration software (for example, a PCIe Root complex) can identify topological logic of the PCIe bus system, each bus in the system, each PCIe device, and each function of each PCIe device, that is, can identify a BDF. In specific implementation, in the BDF, a bus number may occupy eight bits, a device number may occupy five bits, and a function number may occupy three bits.

PCIe device enumeration: A PCIe architecture generally includes PCIe devices of types such as a root complex, a switch, and an endpoint, and there are generally some embedded endpoints (such device does not have a PCIe interface to the outside) in the root complex and the switch. When a computer system in which the PCIe devices are located starts up, a CPU needs to identify these devices. The root complex typically uses a specific algorithm, such as a depth-first algorithm, to access each possible branch path until no further in-depth access is possible, and each PCIe device can be accessed only once. This process is called PCIe device enumeration.

PCIe configuration space: Each PCIe device has space. Host software can obtain some information about the PCIe device by using the space, or configure the PCIe device by using the space. This space is called PCIe configuration space.

Multi-PF scenario: Physical ports of a physical network interface card can be divided into a plurality of PFs, that is, only one port is physically provided, but a plurality of independent PCIe devices, independent network ports, and independent media access control (MAC) addresses, and the like can be seen through scanning of a basic I/O system (BIOS) and on an OS. For example, an Intel XL710 network adapter supports 40 Gigabit Ethernet (GE) and provides one physical network port. A 40 GE network port can be divided into four 10 GE network ports. In this case, one physical port is divided into four PFs.

TLP packet: A PCIe bus transmits data by using a transaction, and this transaction is also referred to as a TLP packet. A TLP packet generally includes a header, a data segment, check information, and the like. A PCIe packet includes memory access read/write, I/O access read/write, configuration space access read/write, a message transaction, and the like.

BAR space address: Each PCIe device (for example, a PF or a VF) has its own internal space, and this internal space is not directly accessible to the CPU. When the CPU needs to read data from the internal space of the PF or the VF, the root complex first reads, by using a TLP packet, the data from the PF or the VF to a memory accessible to the CPU, and then the CPU reads the data from the memory accessible to the CPU. When the CPU needs to write data into the internal space of the PF or the VF, the CPU writes the data into the memory first, and then the root complex writes the data into the internal space of the PF or the VF by using the TLP packet.

FIG. 1 is a schematic diagram of a structure of a server that implements Virtio and SR-IOV at the same time. As shown in FIG. 1, the server 100 includes a CPU 101, a CPU 102, and a network adapter 103. A virtual machine 1011 runs by using the CPU 101 and communicates with the network adapter 103 by using a virtual network interface card 1. A virtual machine 1021 runs by using the CPU 102 and communicates with the network adapter 103 by using a virtual network interface card 2. The virtual machine 1011 supports a Virtio protocol, and an application 1 that is run on the virtual machine 1011 is connected to the network adapter 103 by using a Virtio driver 1. The virtual machine 1021 also supports the Virtio protocol, and an application 2 that is run on the virtual machine 1021 is connected to the network adapter 103 by using a Virtio driver 2. The network adapter 103 supports SR-IOV, and supports running a VF 1 and a VF 2. Packets that need to be sent and received by the application 1 communicate with the VF 1 in the network adapter 103 by using a software forwarding program 104. Similarly, packets that need to be sent and received by the application 2 communicate with the VF 2 in the network adapter 103 by using the software forwarding program 104.

Although the server 100 shown in FIG. 1 has an advantage that both Virtio and SR-IOV technologies are compatible, mapping between Virtio-net and SR-IOV by using the software forwarding program 104 occupies CPU resources in the server 100. This is contrary to the original intention of uninstalling the CPU resources from the intelligent network interface card. In addition, compared with a hardware implementation, a software implementation still has problems of low efficiency and high maintenance costs.

In another manner for implementing Virtio and SR-IOV simultaneously, two sets of resource pools are implemented in a cloud network. One resource pool supports the SR-IOV technology, and the other resource pool supports the Virtio technology. A user can select a required application. For example, when the user selects the SR-IOV technology, a virtual machine may be allocated from the resource pool that supports the SR-IOV technology, or when the user selects the Virtio technology, a virtual machine may be allocated from the resource pool that supports the Virtio technology.

In this manner, two sets of resource pools need to be maintained, and the resource pools cannot be shared, resulting in a waste of resources.

An embodiment of this application provides a method for implementing normalization of an SR-IOV resource pool and a Virtio resource pool, and a computer device, to implement hardware offloading of Virtio protocol packet forwarding while implementing the normalization of the SR-IOV resource pool and the Virtio resource pool, so as to improve I/O performance and resource utilization of the device.

The computer device provided in this embodiment of this application is described below by using a server as an example. It may be understood that a computer device in another form, such as a portable computer or a terminal device, may be implemented with reference to the technical solutions provided in this embodiment of this application, provided that a device for implementing a virtualization technology is connected to and communicates with a network by using a network adapter. Details are not described.

Figure 2A:
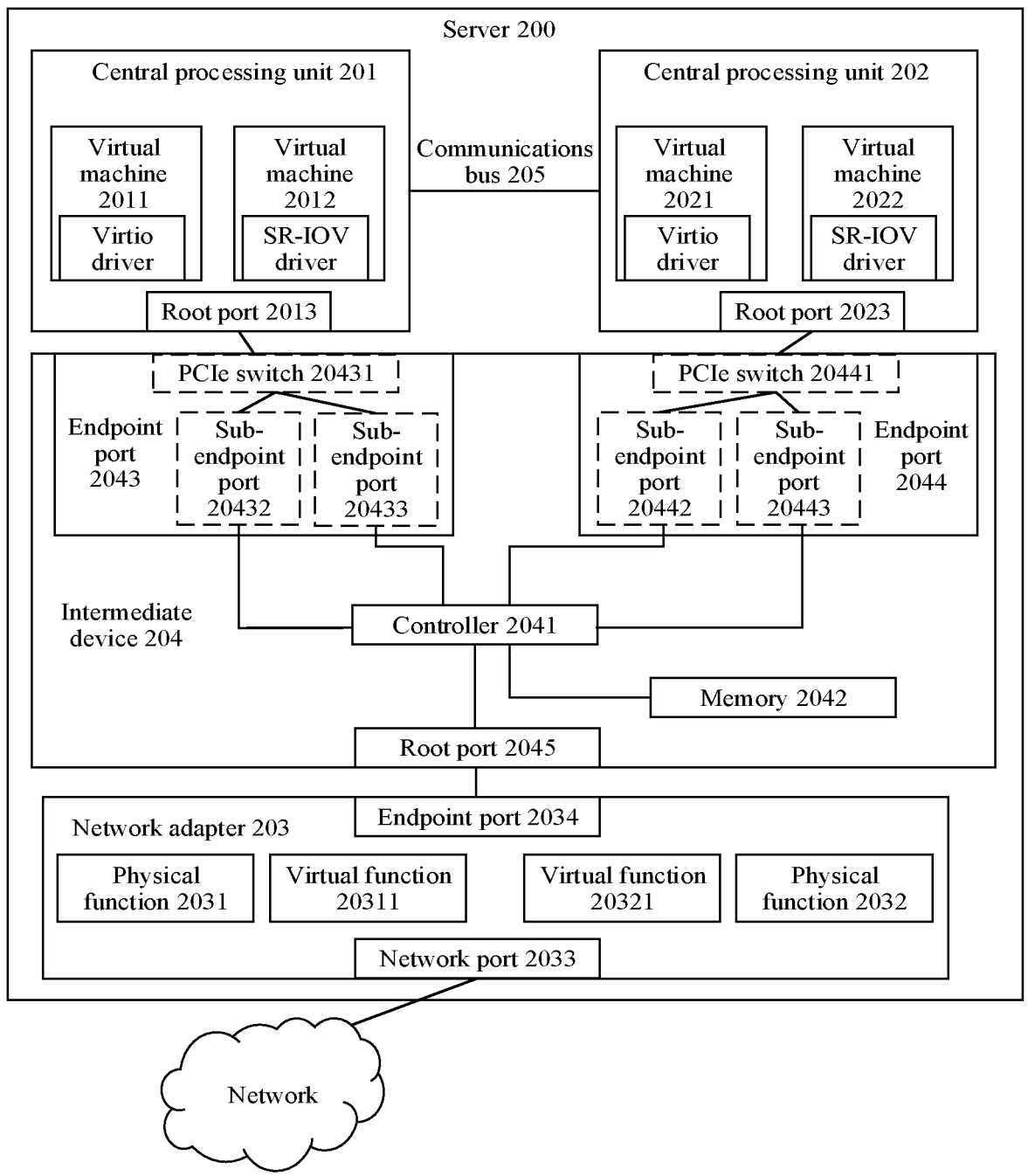
FIG. 2A is a schematic diagram of a structure of an implementation of a server according to an embodiment of this application.

As shown in FIG. 2A, a server 200 includes a CPU 201, a CPU 202, an intermediate device 204, and a network adapter 203. The intermediate device 204 may be implemented by using an FPGA or an ASIC chip, or may be implemented by using both an FPGA and an ASIC chip. FIG. 2A is a schematic diagram of an example in which the intermediate device 204 is located outside the network adapter 203. In an implementation, the intermediate device 204 may alternatively be a chip, for example, an FPGA, an ASIC, or an FPGA+ASIC, deployed on a physical network interface card. The network adapter 203 is a physical network interface card, and is configured to connect to a network and forward a packet (for example, a data packet or a command packet). The CPU 201 and the CPU 202 are connected to and communicate with each other through a communications bus 205. The communications bus 205 includes but is not limited to a Quick Path Interconnect (QPI) bus, a UPI bus, an Integrated Logic Analyzer (ILA) bus, or the like. The CPU 201 and the CPU 202 each are connected to the intermediate device 204 through a bus (including but not limited to a PCIe bus or a UPI bus). The intermediate device 204 is connected to the network adapter 203 through a bus (including but not limited to a PCIe bus or a UPI bus).

To clearly describe the technical solutions provided in the embodiments of this application, an implementation of the server 200 shown in FIG. 2A is further described below by using an example in which the CPU 201 and the CPU 202 each are connected to the intermediate device 204 through a PCIe bus, the intermediate device 204 is connected to the network adapter 203 through a PCIe bus, a virtual machine 2011 using the Virtio technology and a virtual machine 2012 using the SR-IOV technology run via the CPU 201, a virtual machine 2021 using the Virtio technology and a virtual machine 2022 using the SR-IOV technology run via the CPU 202, the network adapter 203 supports SR-IOV, and the intermediate device 204 is implemented by using an FPGA. It may be understood that another implementation, for example, in which the virtual machine 2012 is a virtual machine using the Virtio technology, and the virtual machine 2011 is a virtual machine using the SR-IOV technology, falls within the scope disclosed in the embodiments of this application. Details are not described again.

In FIG. 2A, an example in which the network adapter 203 supporting SR-IOV includes a PF 2031 and a PF 2032, a VF 20311 is associated with the PF 2031, and a VF 20321 is associated with the PF 2032 is used for description. An endpoint port 2034 of the network adapter 203 is connected to a root port 2045 of the intermediate device 204 through the PCIe bus. A network port 2033 is a port used to connect the network adapter 203 to a network.

The intermediate device 204 includes a controller 2041, a memory 2042, an endpoint port 2043, an endpoint port 2044, and a root port 2045. The endpoint port 2043 includes a PCIe switch 20431, a sub-endpoint port 20432, and a sub-endpoint port 20433. The endpoint port 2044 includes a PCIe switch 20441, a sub-endpoint port 20442, and a sub-endpoint port 20443. The controller 2041 is configured to control the intermediate device 204. The memory 2042 is configured to store information that needs to be stored by the controller 2041, including but not limited to address information of function units (such as a PF and a VF) in the network adapter 203, address information of agent units (such as a PF' and a VF') in the intermediate device enumerated by the CPUs (the CPU 201 and the CPU 202), and a correspondence between the address information of the function unit and the address information of the agent unit. The sub-endpoint port 20432 and the sub-endpoint port 20443 are endpoint ports that support SR-IOV. When performing PCIe enumeration, the CPUs (the CPU 201 and the CPU 202) can identify, by using the sub-endpoint port 20432 and the sub-endpoint port 20443, that the intermediate device 204 is an endpoint device that supports SR-IOV. The sub-endpoint port 20433 and the sub-endpoint port 20442 are endpoint ports that support Virtio. When performing PCIe enumeration, the CPUs (the CPU 201 and the CPU 202) can identify, by using the sub-endpoint port 20433 and the sub-endpoint port 20442, that the intermediate device 204 is an endpoint device that supports Virtio.

The intermediate device 204 may be presented as an endpoint device supporting SR-IOV and an endpoint device supporting Virtio to the CPUs (the CPU 201 and the CPU 202). The intermediate device 204 may first enumerate the network adapter 203 to obtain the address information of the function units (such as the PF and the VF) in the network adapter 203. Then, the CPUs (the CPU 201 and the CPU 202) enumerate the intermediate device 204 to obtain the address information of the agent units (such as the PF' and the VP) in the intermediate device 204, and send the address information of the enumerated agent units (such as the PF' and the VP) to the intermediate device 204. The controller 2041 in the intermediate device 204 establishes correspondences between the address information of the function units in the network adapter 203 and the address information of the agent units in the intermediate device 204. The intermediate device 204 may implement, according to the correspondences, packet forwarding between virtual machines running in the CPUs (the CPU 201 and the CPU 202) and the network adapter 203. The agent units (such as the PF' and the VP) in the intermediate device 204 include an agent unit supporting SR-IOV (represented by a PFA' and/or a VFA' in this embodiment of this application), and an agent unit supporting Virtio (represented by a PFB' and/or a VFB' in this embodiment of this application). In this way, when the virtual machine running in the CPU (the CPU 201 or the CPU 202) is configured with a virtualization technology (SR-IOV or Virtio), the intermediate device 204 has a corresponding agent unit configured to forward packets sent and received by the virtual machine.

For example, the controller 2041 may be a system-on-a-chip (System-on-a-Chip, SoC). As a root port in a root complex (Root complex), the root port 2045 is connected to the network adapter 203 through the PCIe bus. The root complex is a root node of a PCIe topology, and generally includes a host bridge, a root port, and an internal bus. In this embodiment of this application, the host bridge may be implemented by the controller 2041. Certainly, the host bridge may alternatively be implemented by another control component in the intermediate device 204 or another control device between the intermediate device and the network adapter 203. The embodiments of this application do not limit a specific implementation of the host bridge.

By implementing the root complex in the intermediate device 204, the controller 2041 in the intermediate device 204 can serve as the root node of the PCIe topology, and can discover a PCIe endpoint device, namely, the network adapter 203, through PCIe enumeration. For example, the controller 2041 discovers the network adapter 203 through PCIe enumeration, and further discovers PFs in the network adapter 203: the PF 2031 and the PF 2032. The controller 2041 enables a VF Enable register of SR-IOV configuration space of each PF, and configures an attribute of a VF, to discover the VF, for example, to discover the VF 20311 and the VF 20321. For example, the controller 2041 configures an SR-IOV capability of the PF 2031 to discover the VF 20311, and configures an SR-IOV capability of the PF 2032 to discover the VF 20321.

The controller 2041 discovers the function units such as the PF and the VF in the network adapter 203 through PCIe enumeration, allocates corresponding BDFs to the discovered PF and the VF based on locations of the PF and the VF in the PCIe topology, and stores the allocated BDFs in the memory 2042. For example, the controller 2041 stores a BDF of the PF 2031, a BDF of the VF 20311, a BDF of the PF 2032, and a BDF of the VF 20321 in the memory 2042. In addition, the controller 2041 obtains a BAR space size of each function unit through enumeration, and configures a BAR space address. The VF 20311 is used as an example. The controller 2041 obtains a BAR space size of the VF 20311, and configures a start address and an address length of BAR space of the VF 20311. The configured start address and address length of the BAR space of the VF 20311 are BAR space address information of the VF 20311. In a similar implementation, the controller 2041 can also obtain a BAR space address of the PF 2031, a BAR space address of the PF 2032, and BAR space address information of the VF 20321. After obtaining a BAR space address of each function unit, the controller 2041 stores the BAR space address of each function unit in the memory 2042.

The memory 2042 may be an independent memory in the intermediate device 204, such as a random-access memory (RAM), and is configured to store the BDF information and the BAR space address information. Certainly, the controller may alternatively store the BDF information and the BAR space address information in another memory in the intermediate device 204. The other memory may be a non-independent memory. This embodiment of this application does not limit specific storage locations of the BDF information and the BAR space address information.

In FIG. 2A, the CPU 201 and the CPU 202 separately run a root complex, so that both the CPU 201 and the CPU 202 serve as root nodes in the PCIe topology, and can discover the PCIe topology in the intermediate device 204 through PCIe enumeration. As a root port in the root complex, a root port 2013 is connected to the endpoint port 2043 of the intermediate device 204 through a PCIe bus, and as a root port in the root complex, a root port 2023 is connected to the endpoint port 2044 of the intermediate device 204 through a PCIe bus. In this embodiment of this application, an example in which a host bridge of the root complex is implemented by the CPU (the CPU 201 or the CPU 202) is used for description. In specific implementation, the host bridge may alternatively be implemented by a north bridge chipset in the server 200, an input output hub (input output hub, IOH) chipset, or the like.

The endpoint port 2043 is a port used to connect the intermediate device 204 to the CPU 201, and the endpoint port 2044 is a port used to connect the intermediate device 204 to the CPU 202. When performing PCIe enumeration on the intermediate device 204, the CPU 201 can enumerate the PCIe switch 20431 through the endpoint port 2043, and further enumerate the sub-endpoint port 20432 and the sub-endpoint port 20433. For example, a PCIe bus number of the PCIe switch 20431 is configured to take precedence over PCIe bus numbers of the sub-endpoint port 20432 and the sub-endpoint port 20433 by default. In this way, when enumerating the intermediate device 204 through the endpoint port 2043, the CPU 201 first enumerates the PCIe switch 20431 according to the PCIe bus number, and then enumerates the sub-endpoint port 20432 and the sub-endpoint port 20433.

The PCIe switch 20431, the sub-endpoint port 20432, and the sub-endpoint port 20433 in the endpoint port 2043 each have independent PCIe configuration space. When performing PCIe enumeration, the CPU 201 obtains content of corresponding PCIe configuration space to implement enumeration on a corresponding PCIe switch and a corresponding PCIe endpoint device. For example, when performing PCIe enumeration on the intermediate device through the endpoint port 2043, the CPU 201 obtains content of the PCIe configuration space of the PCIe switch 20431 to implement enumeration on the PCIe switch, and obtains content of the PCIe configuration space of the sub-endpoint port 20432 or content of the PCIe configuration space of the sub-endpoint port 20433 to implement enumeration on the PCIe endpoint device. For example, the CPU 201 obtains information about a header type in the PCIe configuration space of the PCIe switch 20431. Information recorded in the header type includes but is not limited to information such as an uplink (UP) and a downlink (DP). The CPU 201 identifies, based on the obtained information such as the UP and the DP, that the PCIe switch is enumerated. Because the PCIe switch is enumerated, the CPU 201 continues to further perform enumeration based on the DP of the PCIe switch 20431, to discover the sub-endpoint port 20432 and the sub-endpoint port 20433.

For example, the CPU 201 obtains information about a PF 2031A' from the PCIe configuration space of the sub-endpoint port 20432. For example, the CPU 201 reads a register of the sub-endpoint port 20432. The register stores the information used to identify the PF 2031A', and the CPU 201 discovers the PF 2031A' based on the information. The information used to identify the PF 2031A' may be a segment of code, for example, "non-FFFF". The CPU 201 identifies the intermediate device 204 as an endpoint device that supports SR-IOV by using the PF 2031A'. Optionally, the information used to identify the PF 2031A' may further include class code, and the CPU 201 identifies the intermediate device 204 as the network adapter based on the class code.

Similar to enumerating the sub-endpoint port 20432 by the CPU 201, when the CPU 201 enumerates the sub-endpoint ports 20433, the CPU 201 obtains information about a PF 2031B' from the PCIe configuration space of the sub-endpoint port 20433. For example, the CPU 201 reads a register of the sub-endpoint port 20433. The register stores the information used to identify the PF 2031B', and the CPU 201 discovers the PF 2031B' based on the information. The information used to identify the PF 2031B' includes but is not limited to a vendor identifier (ID), and a value of the vendor id is 0x1AF4. The CPU 201 identifies the intermediate device 204 as an endpoint device supporting Virtio based on the fact that the value of the vendor id is 0x1AF4. Optionally, the information used to identify the PF 2031B' may further include a device id, and a value of the device id is 0x1000. The CPU 201 identifies the intermediate device 204 as the network adapter based on the device id. That the value of the vendor id is 0x1AF4 and that the value of the device id is 0x1000 are specified in a Virtio protocol (for example, Virtio V1.1).

For example, that the register of the sub-endpoint port 20432 includes the information used to identify the PF 2031A' may be configured by the intermediate device 204 during manufacturing, or may be configured in the sub-endpoint port 20432 based on information about a PF in the network adapter 203 after the controller 2041 obtains the information about the PF and information about a VF in the network adapter 203. If the information used to identify the PF 2031A' in the register of the sub-endpoint port 20432 is configured during manufacturing, the information needs to be configured based on information related to the network adapter that may be connected to the intermediate device 204 when the intermediate device 204 is manufactured. If the information used to identify the PF 2031A' in the register of the sub-endpoint port 20432 is configured in the sub-endpoint port 20432 after the controller 2041 obtains the information about the PF in the network adapter 203, the controller 2041 may configure the information about the PF 2031A' in the register of the sub-endpoint port 20432 based on the information about the PF (for example, the PF 2031) in the network adapter 203 connected to the intermediate device 204. Similarly, that the register of the sub-endpoint port 20433 includes the information used to identify the PF 2031B' may be configured by the intermediate device 204 during manufacturing, or may be configured in the sub-endpoint port 20433 based on the information about the PF in the network adapter 203 after the controller 2041 obtains the information about the PF and the information about the VF in the network adapter 203. Details are not described.

The CPU 201 discovers the PF 2031A' in the intermediate device 204 through enumeration, enables a VF Enable register in SR-IOV configuration space of the PF 2031A', and configures an attribute of a VF, to discover a VF 20311A'. For example, the CPU 201 configures an SR-IOV capability of the PF 2031A' to discover the VF 20311A'. The CPU 201 allocates corresponding BDFs to the PF 2031A' and the VF 20311A' based on locations of the PF 2031A' and the VF 20311A' in the PCIe topology. In addition, the CPU 201 obtains BAR space sizes of the PF' and the VF' through enumeration and configures BAR space addresses. The VF 20311A' is used as an example. The CPU 201 obtains a BAR space size of the VF 20311A', and configures a start address and an address length of BAR space of the VF 20311A'. The configured start address and address length of the BAR space of the VF 20311A' are BAR space address information of the VF 20311A'.

After completing the enumeration, the CPU 201 may send the BDF information and the BAR space address information of the PF 2031A' and the BDF information and the BAR space address information of the VF 20311A' to the intermediate device 204 by using TLP packets. The controller 2041 establishes, based on the information sent by the CPU 201, a correspondence between the BDF of the PF 2031A' and the BDF of the PF 2031 and a correspondence between the BDF of the VF 20311A' and the BDF of the VF 20311, and stores the established correspondences in the memory 2042. In addition, the controller 2041 establishes a correspondence between the BAR space address of the PF 2031A' and the BAR space address of the PF 2031 and a correspondence between the BAR space address of the VF 20311A' and the BAR space address of the VF 20311, and stores the established correspondences in the memory 2042.

A process in which the CPU 201 obtains information about a VF 20311B' from the sub-endpoint port 20433 in an enumeration process is similar to a process in which the CPU 201 obtains the information about the VF 20311A' from the sub-endpoint port 20432 in the enumeration process. For example, the CPU 201 enables a VF Enable register in SR-IOV configuration space of the PF 2031B', and configures an attribute of a VF, to discover the VF 20311B'. The CPU 201 allocates corresponding BDFs to the PF 2031B' and the VF 20311B' based on locations of the PF 2031B' and the VF 20311B' in the PCIe topology. The CPU 201 obtains BAR space sizes of the PF 2031B' and the VF 20311B' through enumeration, and configures BAR space addresses. After completing the enumeration, the CPU 201 may send the BDF information and the BAR space address information of the PF 2031B' and the BDF information and the BAR space address information of the VF 20311B' to the intermediate device 204 by using TLP packets. In this way, the controller 2041 establishes a correspondence between the BDF of the PF 2031B' and the BDF of the PF 2031 and a correspondence between the BDF of the VF 20311B' and the BDF of the VF 20311, and stores the established correspondences in the memory 2042. In addition, the controller 2041 establishes a correspondence between the BAR space address of the PF 2031B' and the BAR space address of the PF 2031 and a correspondence between the BAR space address of the VF 20311B' and the BAR space address of the VF 20311, and stores the established correspondences in the memory 2042.

In this way, the PF 2031A' or the PF 2031B' may be considered as an agent of the PF 2031 in the intermediate device 204, or the PF 2031A' or the PF 2031B' is a virtual PF corresponding to the PF 2031 in the intermediate device 204. The VF 20311A' or the VF 20311B' may be considered as an agent of the VF 20311 in the intermediate device 204, or the VF 20311A' or the VF 20311B' is a virtual VF corresponding to the VF 20311 in the intermediate device 204. The CPU 201 discovers, through enumeration, that the intermediate device 204 has a PF function (the PF 2031A') and a VF function (the VF 20311A'), and may use the intermediate device 204 as a network adapter supporting SR-IOV on a PCIe link, to implement forwarding of a packet (a data packet or a command packet) by using the intermediate device 204. In addition, the CPU 201 discovers, through enumeration, that the intermediate device 204 has a PF function (the PF 2031B') and a VF function (the VF 2031B'), and may use the intermediate device 204 as a network adapter supporting Virtio on the PCIe link, to implement forwarding of a packet (a data packet or a command packet) by using the intermediate device 204. The intermediate device 204 may forward a received packet between the intermediate device 204 and the network adapter 203 according to the stored correspondences.

A process in which the CPU 202 enumerates the intermediate device 204 is similar to the foregoing process in which the CPU 201 enumerates the intermediate device 204. For example, when the CPU 202 serves as a root node in the PCIe topology to perform PCIe enumeration, first enumerates the PCIe switch 20441, further performs enumeration by using the PCIe switch 20441, discovers a PF 2032A' through the sub-endpoint port 20443 and configures a VF 20321A', and identifies, by using the PF 2032A', the intermediate device 204 as an endpoint device that supports SR-IOV, and the CPU 202 discovers a PF 2032B' through the sub-endpoint port 20442 and configures a VF 20321B', and identifies, by using the PF 2031B', the intermediate device 204 as an endpoint device that supports Virtio. After completing the enumeration, the CPU 202 may send BDF information and BAR space address information of the PF 2032A', BDF information and BAR space address information of the VF 20321A', BDF information and BAR space address information of the PF 2032B', and BDF information and BAR space address information of the VF 20321B' to the controller 2041 by using TLP packets. The controller

2041 stores a correspondence between a BDF of the PF 2032A' and a BDF of the PF 2032, a correspondence between a BDF of the VF 20321A' and a BDF of the VF 20321, a correspondence between a BDF of the PF 2032B' and a BDF of the PF 2032, and a correspondence between a BDF of the VF 20321B' and a BDF of the VF 20321 in the memory 2042. In addition, the controller 2041 stores a correspondence between a BAR space address of the PF 2032A' and a BAR space address of the PF 2032, a correspondence between a BAR space address of the VF 20321A' and a BAR space address of the VF 20321, a correspondence between a BAR space address of the PF 2032B' and a BAR space address of the PF 2032, and a correspondence between a BAR space address of the VF 20321B' and a BAR space address of the VF 20321 in the memory 2042.

In this way, the PF 2032A' or the PF 2032B' may be considered as an agent of the PF 2032 in the intermediate device 204, or the PF 2032A' or the PF 2032B' is a virtual PF corresponding to the PF 2032 in the intermediate device 204. The VF 20321A' or the VF 20321B' may be considered as an agent of the VF 20321 in the intermediate device 204, or the VF 20321A' or the VF 20321B' is a virtual VF corresponding to the VF 20321 in the intermediate device 204. The CPU 202 discovers, through enumeration, that the intermediate device 204 has a PF function (the PF 2032A') and a VF function (the VF 20321A'), and may use the intermediate device 204 as a network adapter supporting SR-IOV on a PCIe link, to implement forwarding of a packet (a data packet or a command packet) by using the intermediate device 204. In addition, the CPU 202 discovers, through enumeration, that the intermediate device 204 has a PF function (the PF 2032B') and a VF function (the VF 20321B'), and may use the intermediate device 204 as a network adapter supporting Virtio on the PCIe link, to implement forwarding of a packet (a data packet or a command packet) by using the intermediate device 204. The intermediate device 204 forwards a received packet between the intermediate device 204 and the network adapter 203 according to the stored correspondences.

For example, a quantity of agent units (for example, PF's or VF's) included in an endpoint device that supports SR-IOV in the intermediate device 204 is the same as a quantity of function units (for example, PFs or VFs) in the network adapter 203. A quantity of agent units (for example, PF's or VF's) included in an endpoint device that supports Virtio is also the same as a quantity of function units (for example, PFs or VFs) in the network adapter 203. Therefore, the quantity of agent units included in the intermediate device 204 may be twice the quantity of function units in the network adapter 203. Certainly, in specific implementation, the quantity of agent units (for example, PF's or VF's) included in the intermediate device 204 may be different from the quantity of function units (for example, PFs or VFs) in the network adapter 203, provided that the intermediate device has a corresponding agent unit (an agent unit included in an endpoint device that supports SR-IOV or an agent unit included in an endpoint device that supports Virtio) for serving as an agent of a function unit in the network adapter 203, to implement packet forwarding between a virtual machine (for example, the virtual machine 2011 or the virtual machine 2012) and the network adapter 203, which falls within the scope covered by the embodiments of this application.

The server 200 shown in FIG. 2A is used as an example. When packets of different virtual machines are forwarded to the network adapter 203 via the intermediate device 204, a conflict may exist. For example, the virtual machine 2011 sends a packet through the sub-endpoint port 20433, and the virtual machine 2012 sends a packet through the sub-endpoint port 20432. When both the two packets need to be forwarded by the intermediate device 204, the controller 2041 needs to determine a forwarding sequence of the packets. In addition, for packets sent by the network adapter 203 to different virtual machines by using the intermediate device 204, a specific path needs to be determined to forward the packets to a destination virtual machine. For example, when the network adapter 203 separately sends a packet to the virtual machine 2011 and the virtual machine 2012 by using the intermediate device, the controller 2041 needs to determine a path for sending the packet, that is, needs to determine whether to select a path from the sub-endpoint port 20432 to the PCIe switch 20431 or select a path from the sub-endpoint port 20433 to the PCIe switch 20441, so that the packets can be sent to the destination virtual machines.

Figure 2B:
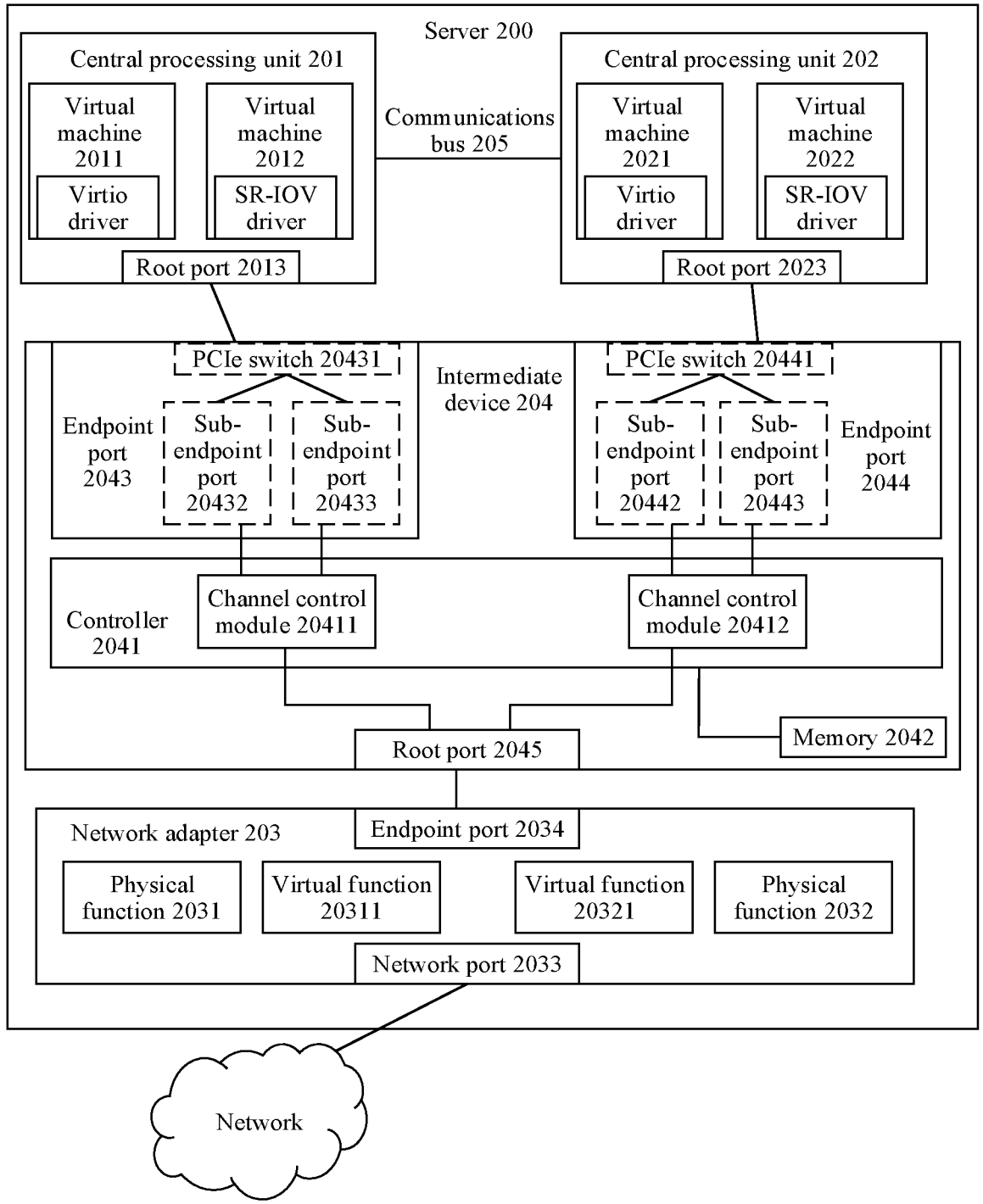
FIG. 2B is a schematic diagram of a structure of another implementation of the server according to an embodiment of this application.

To implement effective packet forwarding between the virtual machine and the network adapter by the intermediate device 204, the intermediate device 204 provided in this embodiment of this application further includes a channel control function, to resolve a conflict and a path selection problem during packet forwarding. As shown in FIG. 2B, the controller 2041 in the intermediate device 204 further includes a channel control module 20411 and a channel control module 20412. The channel control module 20411 is configured to control forwarding of packets sent and received by the virtual machine 2011 and the virtual machine 2012 with the network adapter 203. The channel control module 20412 is configured to control forwarding of packets sent and received by the virtual machine 2021 and the virtual machine 2022 with the network adapter 203.

For example, the channel control module 20411 implements channel control. When the virtual machine 2011 and the virtual machine 2012 simultaneously forward packets to the network adapter 203 by using the intermediate device 204, the channel control module 20411 may separately forward to-be-sent packets in a polling manner. Alternatively, the channel control module 20411 may store received packets into a preset forwarding queue, and forward packets in the queue according to a sending mechanism of the queue (for example, according to a first-in first-out mechanism). Optionally, the channel control module 20411 may separately forward, according to a sequence of the received packets, the packets sent by the virtual machine 2011 and the virtual machine 2012. It may be understood that the foregoing manner in which the channel control module 20411 implements channel control is merely an example. In specific implementation, channel control may also be implemented in other manners.

When the virtual machine 2011 and the virtual machine 2012 each receive, by using the intermediate device 204, a packet sent by the network adapter 203, the controller 2041 needs to determine a path for forwarding the packet, to forward the packet to a destination virtual machine.

The channel control module 20411 may implement path selection by setting a channel selection switch. For instance, the channel selection switch set by the channel control module 20411 may be a channel control register. For example, the channel control register may be a register in BAR space of the intermediate device 204. In this embodiment of this application, the register in the BAR space includes but is not limited to a register in the BAR space of the sub-endpoint port 20432, or a register in the BAR space of the sub-endpoint port 20432. The channel control register may be a 2-bit register. For example, bit 00 indicates that both channels are enabled. Bit 01 indicates that a channel of the sub-endpoint port 20432 that supports SR-IOV is enabled and a channel of the sub-endpoint port 20433 that supports Virtio is disabled. Bit 10 indicates that the channel of the sub-endpoint port 20432 that supports SR-IOV is disabled, and the channel of the sub-endpoint port 20433 that supports Virtio is enabled. Bit 11 indicates that both channels are disabled. Optionally, a configuration of the channel control register may be implemented by using a network adapter driver of the virtual machine 2011 or a network adapter driver of the virtual machine 2012 in a manner of sending a TLP packet. After the channel control register is configured, when the intermediate device 204 forwards the packet sent by the network adapter 203, the intermediate device 204 may determine a specific channel based on the configuration of the channel control register and send a corresponding packet.

For example, after the virtual machine 2012 supporting SR-IOV is created, the network adapter driver of the virtual machine 2012 configures the channel control module 20411 that is used as a channel control register, and sets a bit to 01. In this way, after a packet sent by the network adapter 203 to the virtual machine 2012 passes through the channel control module 20411, a path including the sub-endpoint port 20432 that supports SR-IOV is determined as a path for forwarding the packet, and the packet is sent to the PCIe switch 20431 through the sub-endpoint port 20432 and is forwarded to the virtual machine 2012 by the PCIe switch 20431. For another example, after the virtual machine 2011 supporting Virtio is created, the network adapter driver of the virtual machine 2011 configures the channel control module 20411 that is used as a channel control register, and sets a bit to 10. In this way, after a packet sent by the network adapter 203 to the virtual machine 2011 passes through the channel control module 20411, a path including the sub-endpoint port 20433 that supports Virtio is determined as a path for forwarding the packet, and the packet is sent to the PCIe switch 20431 through the sub-endpoint port 20433 and is forwarded to the virtual machine 2011 by the PCIe switch 20431.

In specific implementation, packets sent and received by each virtual machine are forwarded by using a corresponding VF in the network adapter 203. Therefore, each virtual machine has a corresponding channel control register in a register of the BAR space of the intermediate device 204. In this way, when forwarding a packet sent by the network adapter 203 to the virtual machine, the intermediate device 204 implement path selection based on a path configured by a channel control register corresponding to each virtual machine. Channel control registers corresponding to each virtual machine may be distinguished by using different identifiers. In an implementation, a BDF number of each VF in the network adapter 203 may be used as an identifier for distinguishing each channel control register. Because a packet sent from the network adapter 203 to the virtual machine carries a BDF number of a VF that sends the packet, the controller 2041 may determine a specific channel control register based on the BDF number of the VF in the received packet, and further implements packet forwarding according to a forwarding path configured by the determined channel control register.

It should be noted that the foregoing channel control register enables both channels by default, that is, a related bit is set to 00, so that the CPU 201 can enumerate the sub-endpoint port 20432 and the sub-endpoint port 20433 separately.

In the description in FIG. 2A, an implementation is described by using an example in which the CPU 201 supports running two virtual machines (the virtual machine 2011 and the virtual machine 2012). In specific implementation, when the CPU 201 supports running one virtual machine, the virtual machine may be a virtual machine using an SR-IOV technology, or may be a virtual machine using a Virtio technology. Regardless of which virtualization technology is used by the virtual machine, the implementation in FIG. 2A may be combined. For example, in an implementation of the intermediate device 204, forwarding of packets sent and received by virtual machines using different virtualization technologies is implemented, and the CPU 201 does not need to perform additional configuration. This implements normalization of resource pools of the virtual machines supporting the different virtualization technologies, and improves CPU resource utilization.

In FIG. 2B, two channel control modules are used as an example to describe an implementation in which the intermediate device 204 implements channel control. In specific implementation, channel control may also be implemented in other manners. For example, the two channel control modules in FIG. 2B may be combined, or channel control may be implemented by using two other channel control modules different from the channel control modules in FIG. 2B. When channel control is implemented by using one channel control module, the channel control register may be 3 bits, and the 3-bit register can identify selection control of four different paths. When channel control is implemented by using the other two channel control modules, one of the channel control modules may be configured to determine a specific endpoint port (for example, the endpoint port 2043 or the endpoint port 2044) based on a BDF number of a VF carried in a packet, and the other channel control module selects different paths by using a 2-bit register. Specific implementation details may be implemented with reference to the implementation of the channel control module 20411 or the channel control module 20412, and are not described again.

It should be noted that, the Virtio protocol describes content that Virtio is implemented by using a PCIe bus, a vendor id in PCIe configuration space of the Virtio is 0x1AF4, and a device id is 0x1000. In addition, an agent unit VF' is attached to an agent unit PF', so that a vendor id and a device id in configuration space of the VF' are the same as a vendor id and a device id in configuration space of the PF'. Therefore, when the virtual machine that uses the Virtio technology is switched to the virtual machine that uses the SR-IOV technology, path control configured in the intermediate device 204 is switched at a granularity of PF'. For example, in FIG. 2B, two PFs (the PF 2031 and the PF 2032) are implemented in the network adapter 203, and each PF may be associated with a plurality of VFs (although FIG. 2B shows an example in which one VF is associated). The intermediate device 204 implements four endpoint devices, two of the endpoint devices support SR-IOV, and the other two endpoint devices support Virtio. Each endpoint device has one PF' and a VF' associated with the PF'. When the virtual machine 2012 is switched to the virtual machine that uses the Virtio technology, the channel control module of the virtual machine 2012 needs to perform path control switching. The path control switching is performed at a granularity of PF', that is, a path including the sub-endpoint port 20432 is switch to a path including the sub-endpoint port 20433.

It may be understood that, if the Virtio protocol may be modified, the vendor id of the VF' may be different from the vendor id of the PF'. With reference to the foregoing implementation, switching at a granularity of VF' may also be implemented, and details are not described again.

In this embodiment of this application, when forwarding a packet of the virtual machine 2011 or the virtual machine 2012, the PCIe switch 20431 selects a forwarding path based on a BDF number and/or a BAR space address carried in the packet. For a PCIe Configure packet, the PCIe switch 20431 selects a forwarding path based only on a BDF number carried in the packet. For a PCIe memory read/write packet, the PCIe switch 20431 further needs to select a forwarding path based on a BAR space address in the packet. When performing PCIe enumeration, the CPU 201 allocates a corresponding BDF number and a BAR space address to an agent unit (a PF' or a VF') discovered by using the sub-endpoint port 20432, and also allocates a corresponding BDF number and a BAR space address to an agent unit (a PF' or a VP) discovered by using the sub-endpoint port 20433. A correspondence between the BDF number and the BAR space address allocated by the CPU 201 and the sub-endpoint port is recorded in the PCIe configuration space of the PCIe switch 20431. When receiving a packet that needs to be forwarded and that includes a BDF number and/or a BAR space address, the PCIe switch 20431 forwards the packet through a corresponding sub-endpoint port according to the recorded correspondence. For example, a memory read/write packet sent by the virtual machine 2011 carries information such as a BDF number and a BAR space address of the VF 20311B'. When receiving the memory read/write packet sent by the virtual machine 2011, the PCIe switch 20431 determines, based on the information such as the BDF number and the BAR space address in the packet and the recorded correspondence, that the packet needs to be forwarded through the sub-endpoint port 20433. When receiving the packet forwarded through the sub-endpoint port 20433, the PCIe switch 20431 also sends the packet to a corresponding virtual machine according to the correspondence recorded in the PCIe configuration space and address information carried in the packet. Details are not described again.

The foregoing uses the virtual machine 2011 and the virtual machine 2012 as an example to describe the implementation process of path selection or control when the virtual machine sends and receives a packet. A manner in which the virtual machine 2021 and the virtual machine 2022 send and receive the packet is similar to the foregoing, and details are not described again.

Figure 2C:
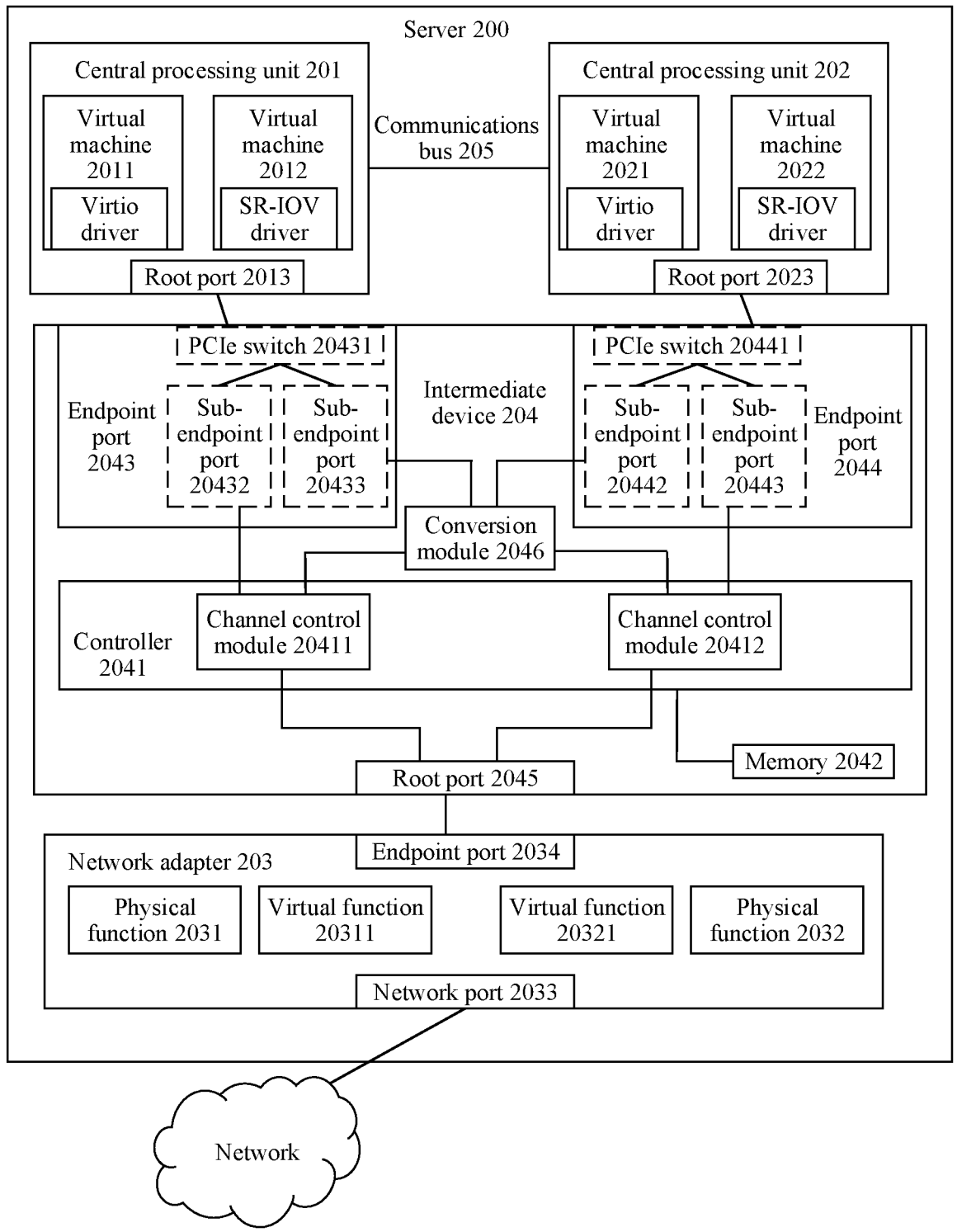
FIG. 2C is a schematic diagram of a structure of still another implementation of the server according to an embodiment of this application.

When the virtual machine 2011 or the virtual machine 2021 that supports running the Virtio protocol needs to send a packet, the intermediate device 204 needs to convert a packet of the Virtio protocol into a packet of a protocol used between the intermediate device 204 and the network adapter 203, and then packet forwarding between the intermediate device 204 and the network adapter 203 can be implemented. As shown in FIG. 2C, the intermediate device 204 further includes a conversion module 2046. The conversion module 2046 is configured to implement conversion of a packet sent by a virtual machine (for example, the virtual machine 2011 or the virtual machine 2021) that supports running the Virtio protocol, so that a converted packet can be forwarded between the intermediate device 204 and the network adapter 203.

A manner of forwarding a packet between the intermediate device 204 and the network adapter 203 includes but is not limited to a manner of a common DMA command or an NVMe manner. The following separately describes a manner in which the conversion module 2046 implements conversion by using an example in which a packet is transmitted between the intermediate device 204 and the network adapter 203 in a common DMA command manner and an NVMe manner. For another forwarding manner implemented between the intermediate device 204 and the network adapter 203, refer to the following conversion manner of a common DMA command or an NVMe command. Details are not described again.

1. A manner in which the conversion module 2046 converts a Virtio protocol packet into a common DMA command packet 1.1: A conversion manner used when the virtual machine 2011 sends a packet to the network adapter 203

When sending a packet to the network adapter 203, the virtual machine 2011 encapsulates address information of the to-be-sent packet in memory space into a descriptor indicating an address of the memory space, constructs a Virtio ring based on the descriptor, and writes the Virtio ring into the BAR space of the sub-endpoint port 20433 to notify the intermediate device 204. The conversion module 2046 in the intermediate device 204 reads information about the descriptor through the sub-endpoint port 20433, initiates a DMA operation based on the read information about the descriptor to obtain the descriptor, and generates a DMA command including the descriptor. Optionally, the DMA command may be generated in a queue manner. The generated DMA command undergoes address mapping (address mapping between an agent unit and a function unit that is implemented by the controller 2041), and then is sent to the network adapter 203 through the root port 2045. The network adapter 203 initiates a TLP memory read operation based on the descriptor in the obtained DMA command, and reads data from memory space corresponding to the descriptor by using the intermediate device 204.

In another implementation, after obtaining the descriptor, the conversion module 2046 may directly read the data from the memory space corresponding to the descriptor, store the obtained data into a segment of storage space of the intermediate device 204 (for example, a segment of storage space of the memory 2042), generate a new descriptor based on the segment of storage space, and send a DMA command including the new descriptor to the network adapter 203. The network adapter 203 obtains corresponding data from the segment of storage space of the intermediate device 204 according to the received DMA command.

1.2: A conversion manner used when the virtual machine 2011 receives a packet from the network adapter 203

The virtual machine 2011 reserves empty memory space in advance, encapsulates address information of the memory space into a descriptor indicating an address of the memory space, constructs Virtio ring based on the descriptor, and writes the Virtio ring into the BAR space of the sub-endpoint port 20433 to notify the intermediate device 204. The conversion module 2046 in the intermediate device 204 reads information about the descriptor through the sub-endpoint port 20433, initiates a DMA operation based on the read information about the descriptor to obtain the descriptor, and generates a DMA command including the descriptor. Optionally, the DMA command may be generated in a queue manner. The generated DMA command undergoes address mapping, and then is sent to the network adapter 203 through the root port 2045. The network adapter 203 initiates a TLP memory write operation based on the descriptor in the obtained DMA command, and directly writes, by using the intermediate device 204, a packet that needs to be sent into the memory space prepared by the virtual machine 2011.

In another implementation, after obtaining the descriptor, the conversion module 2046 may reserve a segment of storage space (for example, the memory 2042) in the intermediate device 204, generate a new descriptor based on the segment of storage space, and send a DMA command including the new descriptor to the network adapter 203. The network adapter 203 writes the to-be-sent data into the segment of storage space of the intermediate device 204 according to the received DMA command. The conversion module 2046 writes the data in the segment of storage space into the memory space prepared by the virtual machine 2011.

2. A manner in which the conversion module 2046 converts a Virtio protocol packet into an NVMe packet 2.1: A conversion manner used when the virtual machine 2011 sends a packet to the network adapter 203

When sending a packet to the network adapter 203, the virtual machine 2011 encapsulates address information of the to-be-sent packet in memory space into a descriptor indicating an address of the memory space, constructs Virtio ring based on the descriptor, and writes the Virtio ring into the BAR space of the sub-endpoint port 20433 to notify the intermediate device 204. The conversion module 2046 in the intermediate device 204 reads information about the descriptor through the sub-endpoint port 20433, initiates a DMA operation based on the read information about the descriptor, to obtain the descriptor, and generates a DMA command including the descriptor according to the NVMe protocol. The conversion module 2046 writes the generated DMA command into a send queue, and writes a command pointer and a base address of the send queue into a doorbell register of the network adapter 203, to send a TLP packet. The controller 2041 replaces an address of an agent unit of the TLP packet with an address of a corresponding function unit according to a stored correspondence between the address of the agent unit and the address of the function unit, and sends the TLP packet with the replaced address to the network adapter. The network adapter 203 obtains the descriptor in the DMA command from the send queue based on the command pointer and the base address of the send queue in the TLP packet, initiates a TLP memory read operation, and directly reads data from a memory corresponding to the descriptor by using the intermediate device. After data reading is completed, the network adapter 203 writes a result indicating that the data reading is completed into a completion queue, and sends an interrupt to the intermediate device 204 to indicate that the execution is completed.

In another implementation, after obtaining the descriptor, the conversion module 2046 may directly obtain to-be-sent data, store the to-be-sent data into a segment of storage space of the intermediate device 204 (for example, a segment of storage space of the memory 2042), generate a new descriptor based on the segment of storage space, write a DMA command including the new descriptor into a send queue, and write a command pointer and a base address of the send queue into a doorbell register of the network adapter 203, to send a TLP packet. The controller 2041 replaces an address of an agent unit of the TLP packet with an address of a corresponding function unit according to a stored correspondence between the address of the agent unit and the address of the function unit, and sends the TLP packet with the replaced address to the network adapter. The network adapter 203 obtains corresponding data from the segment of storage space of the intermediate device 204 according to the received DMA command.

2.2: A conversion manner used when the virtual machine 2011 receives a packet from the network adapter 203

The virtual machine 2011 reserves empty memory space in advance, encapsulates address information of the memory space into a descriptor indicating an address of the memory space, constructs Virtio ring based on the descriptor, and writes the Virtio ring into the BAR space of the sub-endpoint port 20433 to notify the intermediate device 204. The conversion module 2046 in the intermediate device 204 reads information about the descriptor through the sub-endpoint port 20433, initiates a DMA operation based on the read information about the descriptor, to obtain the descriptor, generates a DMA command including the descriptor according to the NVMe protocol, writes the generated DMA command into a send queue, and writes a command pointer and a base address of the send queue into a doorbell register of the network adapter 203, to send a TLP packet. The controller 2041 replaces an address of an agent unit of the TLP packet with an address of a corresponding function unit according to a stored correspondence between the address of the agent unit and the address of the function unit, and sends the TLP packet with the replaced address to the network adapter. The network adapter 203 obtains the descriptor in the DMA command in the send queue based on the command pointer and the base address of the send queue, initiates a TLP memory write operation, and directly writes, by using the intermediate device 204, a packet that needs to be sent into the memory space prepared by the virtual machine 2011. After data writing is completed, the network adapter 203 writes a result indicating that the data writing is completed into a completion queue, and sends an interrupt to the intermediate device 204 to indicate that the execution is completed.

In another implementation, after obtaining the descriptor, the conversion module 2046 may reserve a segment of storage space of the intermediate device 204 (for example, a segment of storage space of the memory 2042), generate a new descriptor based on the segment of storage space, write a DMA command including the new descriptor into a send queue, and write a command pointer and a base address of the send queue into a doorbell register of the network adapter 203, to send a TLP packet. The controller 2041 replaces an address of an agent unit of the TLP packet with an address of a corresponding function unit according to a stored correspondence between the address of the agent unit and the address of the function unit, and sends the TLP packet with the replaced address to the network adapter. The network adapter 203 writes the to-be-sent data into the segment of storage space of the intermediate device 204 according to the received DMA command. The conversion module 2046 writes the data in the segment of storage space into the memory space prepared by the virtual machine 2011.

Because the intermediate device 204 is implemented by using hardware such as an FPGA, an ASIC, or an FPGA+ASIC, and a function of the conversion module 2046 is implemented in the intermediate device 204, hardware offloading of Virtio protocol packet forwarding is implemented. The forwarding performance is better than that in a Virtio protocol packet forwarding manner implemented by using software, occupied CPU resources may be reduced, and CPU resource utilization may be improved.

It should be noted that the foregoing describes a process of implementing protocol conversion by the virtual machine 2011 using the Virtio technology in FIG. 2C. A process of implementing protocol conversion by the virtual machine 2021 using the Virtio technology is similar to the foregoing implementation, and details are not described again.

Figure 2D:
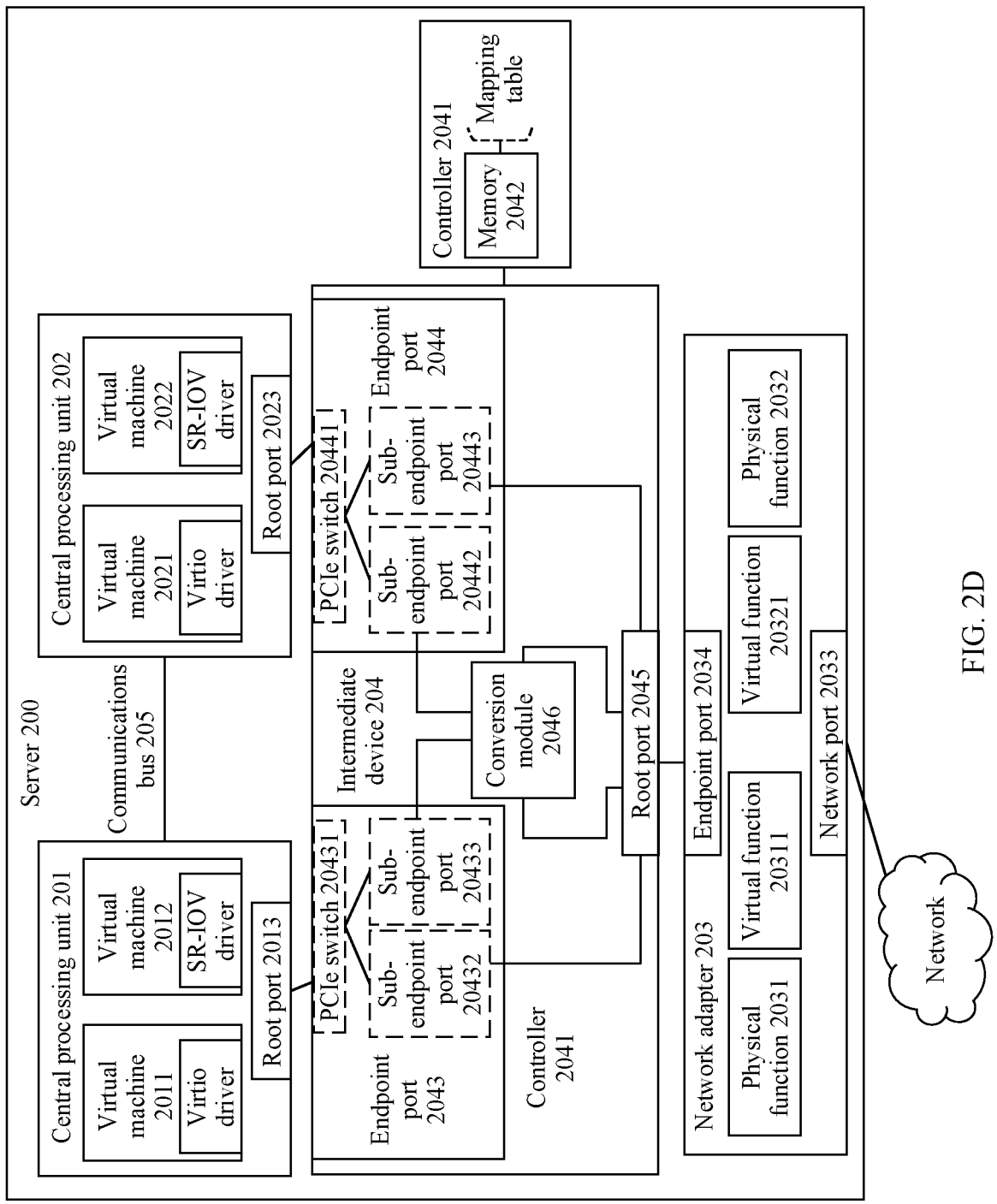
FIG. 2D is a schematic diagram of a structure of still another implementation of the server according to an embodiment of this application.

In an optional implementation, the controller 2041 of the intermediate device 204 in FIG. 2C may alternatively be deployed outside the intermediate device 204. As shown in FIG. 2D, the controller 2041 is connected to the intermediate device 204 through a bus (for example, a PCIe bus). For example, the controller 2041 in FIG. 2D may be implemented by an SOC. FIG. 2D illustrates an example in which the controller 2041 includes the memory 2042. In specific implementation, the memory 2042 may alternatively be deployed outside the controller 2041. The memory 2042 in FIG. 2D may be implemented by a storage medium such as a RAM, and may be configured to store a correspondence between a BDF of a PF and a BDF of a PF', a correspondence between a BDF of a VF and a BDF of a VF', a correspondence between a BAR space address of the PF and a BAR space address of the PF', and a correspondence between a BAR space address of the VF and a BAR space address of the VF'. In addition, the controller 2041 in FIG. 2D can also implement functions of the channel control module 20411 and the channel control module 20412 in FIG. 2C. For brevity of illustration, the channel control module 20411 and the channel control module 20412 are not shown in FIG. 2D.

FIG. 2A to FIG. 2D describe the technical solutions provided in the embodiments of this application based on an example in which one CPU supports running two virtual machines, a network adapter supports two PFs, and each PF is associated with one VF. In specific implementation, one CPU may support running a plurality of virtual machines, one network adapter may support a plurality of PFs, and each PF may be associated with a plurality of VFs. To further clearly describe the technical solutions provided in the embodiments of this application, the following uses an example in which a server includes two CPUs and one network adapter, each CPU supports running 128 VMs, the network adapter supports four PFs, each PF is associated with 64 VFs, and a communications bus is a PCIe bus to further describe an implementation of an intermediate device provided in the embodiments of this application.

Figure 3:
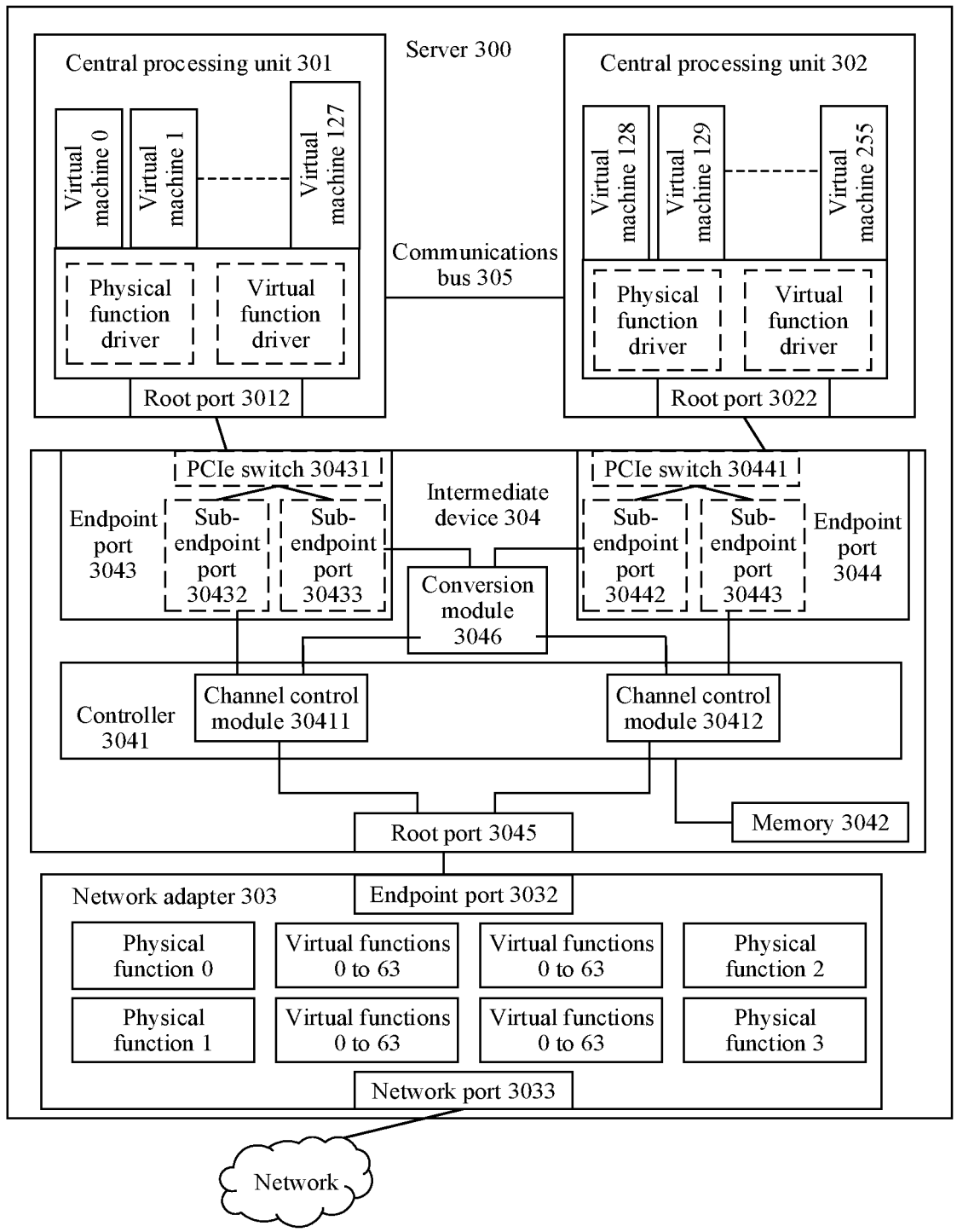
FIG. 3 is a schematic diagram of a structure of an implementation of a server according to an embodiment of this application.

As shown in FIG. 3, a server 300 includes a CPU 301, a CPU 302, an intermediate device 304, and a network adapter 303. The intermediate device 304 is similar to the intermediate device 204, and may be implemented by a device, for example, an FPGA, an ASIC, or an FPGA+ASIC. The network adapter 303 is a physical network interface card, and is connected to the intermediate device 304 through a PCIe bus. The CPU 301 and the CPU 302 are connected to and communicate with each other through a communications bus 305, and both the CPU 301 and the CPU 302 are connected to the intermediate device 304 through a PCIe bus. The communications bus 305 includes but is not limited to a QPI bus, a UPI bus, or an IAL bus.

An endpoint port 3043 is a port used to connect the intermediate device 304 to the CPU 301, and an endpoint port 3044 is a port used to connect the intermediate device 304 to the CPU 302. The endpoint port 3043 includes a PCIe switch 30431, a sub-endpoint port 30432, and a sub-endpoint port 30433. The endpoint port 3044 includes a PCIe switch 30441, a sub-endpoint port 30442, and a sub-endpoint port 30443. The sub-endpoint port 30432 and the sub-endpoint port 30443 are endpoint ports that support SR-IOV. When performing PCIe enumeration, the CPUs (the CPU 301 and the CPU 302) can identify, by using the sub-endpoint port 30432 and the sub-endpoint port 30443, that the intermediate device 304 is an endpoint device that supports SR-IOV. The sub-endpoint port 30433 and the sub-endpoint port 30442 are endpoint ports that support Virtio. When performing PCIe enumeration, the CPUs (the CPU 301 and the CPU 302) can identify, by using the sub-endpoint port 30433 and the sub-endpoint port 30442, that the intermediate device 304 is an endpoint device that supports Virtio.

The network adapter 303 supports SR-IOV, and the endpoint port 3032 of the network adapter 303 is connected to a root port 3045 of the intermediate device 304 through a PCIe bus. A network port 3033 is a port used to connect the network adapter 303 to a network.

It should be understood that FIG. 3 is merely for convenience of description, and only hardware resources such as a CPU and a network adapter are shown. In specific implementation, the server 300 shown in FIG. 3 may further include hardware resources such as a memory and a hard disk, and software resources such as an operating system and an application program that need to be run.

For an implementation of one PF and one VF in the network adapter 303 in FIG. 3, refer to an implementation of one PF and one VF included in the network adapter 203 according to any implementation described in FIG. 2A to FIG. 2D, for example, refer to an implementation of the PF 2031 and the VF 20311 included in the network adapter 203 according to any implementation described in FIG. 2A to FIG. 2D. For an implementation of one PF' and one VF' in the intermediate device 304, refer to any implementation of one PF' and one VF' in the intermediate device 204 described in FIG. 2A to FIG. 2D. For example, for an agent unit supporting SR-IOV, refer to any implementation of the PF 2031A' and the VF 20311A' in the intermediate device 204 described in FIG. 2A to FIG. 2D. For an agent unit supporting Virtio, refer to any implementation of the PF 2031B' and the VF 20311B' in the intermediate device 204 described in FIG. 2A to FIG. 2D.

In FIG. 3, the CPU 301 supports running a VM 0 to a VM 127, and the CPU 302 supports running a VM 128 to a VM 255. Any one of the VM 0 to the VM 255 may be a virtual machine using the SR-IOV technology, or may be a virtual machine using the Virtio technology.

Whether a VM uses the SR-IOV technology or the Virtio technology is selected and configured by a user when the user creates the VM. For example, the server 300 creates a corresponding virtual machine based on a virtualization technology selected when the user creates the virtual machine.

The network adapter 303 includes PF0 to PF3, and each PF is associated with 64 VFs VF0 to VF63. For example, a VF associated with PF0 and a VF associated with PF1 separately correspond to the VM 0 to the VM 127, and are used to implement forwarding of packets (such as data packets or command packets) in the VM 0 to the VM 127, and a VF associated with PF2 and a VF associated with PF3 separately correspond to the VM 128 and the VM 255, and are used to implement forwarding of packets (such as data packets or command packets) in the VM 128 to the VM 255. A corresponding PF driver and VF driver are respectively run in the CPU 301 and the CPU 302 to support corresponding VMs to perform corresponding functions.

It can be understood that, for ease of description only, the CPU 301 in FIG. 3 supports running the VM 0 to the VM 127, and the CPU 302 supports running the VM 128 to the VM 255. A quantity of the VMs in the server 300 is the same as a quantity of the VFs in the network adapter 303, and the VMs and the VFs are in a one-to-one correspondence. In specific implementation, a quantity of VMs running in the CPU 301 and the CPU 302 may alternatively be different from a quantity of VFs in the network adapter 303. For example, the CPU 301 supports running 100 VMs, and the 100 VMs respectively correspond to 100 VFs, so that the 100 VMs implement forwarding of data packets or command packets by using corresponding VFs. This embodiment of this application does not limit the quantity of the VMs running in the server 300 or the quantity of the PFs or VFs in the network adapter 303, provided that the VMs have corresponding VFs for implementing forwarding of data packets or command packets.

Figure 4A:
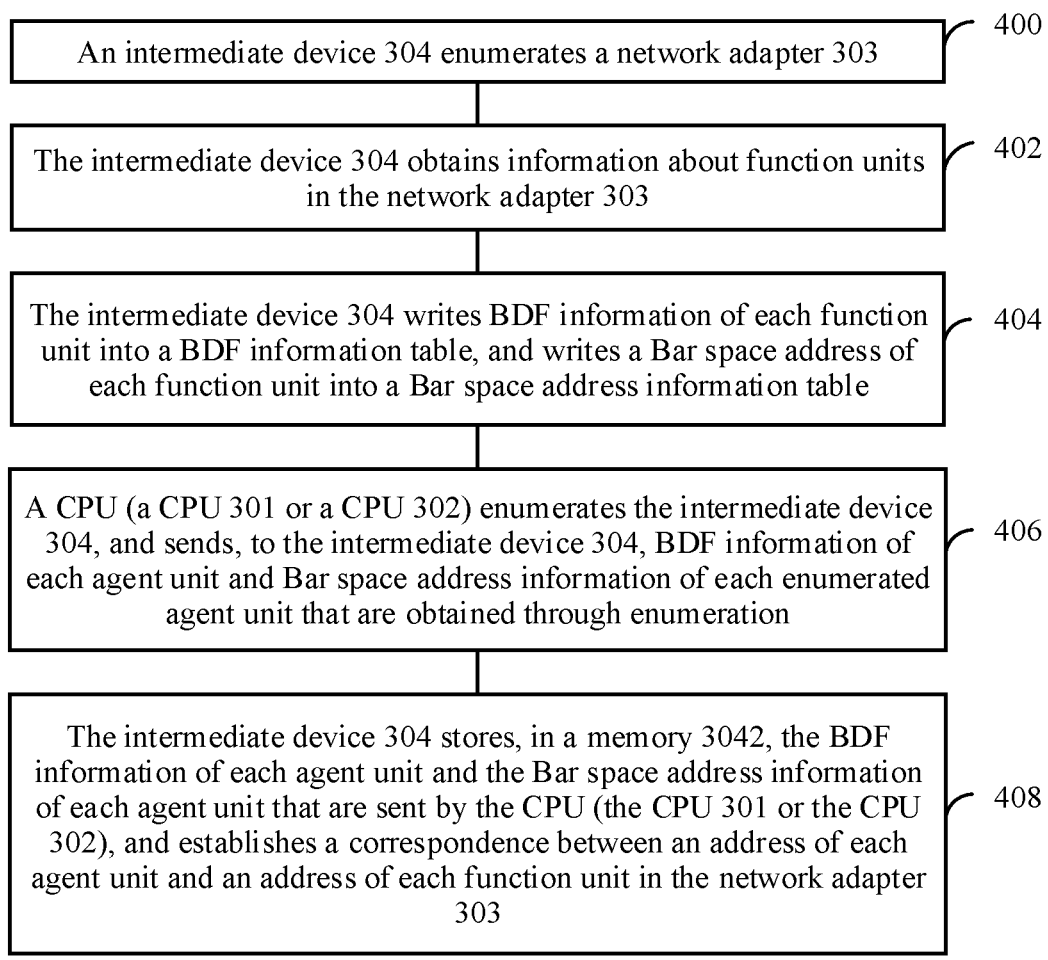
FIG. 4A is a schematic flowchart of a method for establishing a mapping table by an intermediate device in FIG. 3.

A method for establishing a mapping table for the intermediate device 304 in FIG. 3 is used as an example for description. As shown in FIG. 4A, the method includes the following.

Step 400: The intermediate device 304 enumerates the network adapter 303.

When the server 300 is powered on, the intermediate device 304 as a root complex enumerates the network adapter 303 through the endpoint port 3032.

For example, the controller 3041 in the intermediate device 304 can implement a function of a Host bridge in the root complex, to implement PCIe enumeration on the network adapter 303.

Step 402: The intermediate device 304 obtains information about function units (a PF and a VF) in the network adapter 303.

For example, when the controller 3041 in the intermediate device 304 performs PCIe enumeration on the network adapter 303 through the root port 3045, PFs in the network adapter 303, namely, PF0 to PF3, are enumerated first. The controller 3041 enables a VF Enable register of SR-IOV configuration space of each PF, configures attributes of the VFs, and then enumerates the 64 VFs associated with each PF. In this way, the controller 3041 discovers, through PCIe enumeration, that the network adapter 303 includes four PFs and 64 VFs associated with each PF.

Step 404: The intermediate device 304 writes BDF information of each function unit into a BDF information table, and writes a BAR space address of each function unit into a BAR space address information table.

The BDF information of each function unit includes BDF information of each PF and BDF information of each VF. The BAR space address of each function unit includes a BAR space address of each PF and a BAR space address of each VF.

For example, the controller 3041 in the intermediate device 304 writes the BDF information of each PF and the BDF information of each VF in the network adapter 303 into the memory 3042 in a form of a BDF information table based on the BDF information obtained in the step 402. The BDF information table may be shown in FIG. 4B. It should be noted that FIG. 4B shows only a specific implementation of the BDF information table. For example, the BDF information of the PFs is indexed in order of the PFs, and the BDF information of the VFs is indexed in order of the VFs. In addition, FIG. 4B shows only information about PF0 and information about VF0 to VF63 associated with PF0. A form in which information about PF1 to PF3 and information about VFs associated with PF1 to PF3 are recorded in the BDF information table is similar to the form in which the information about PF0 and the information about VF0 to VF63 associated with PF0 are recorded. Details are not described again.

The controller 3041 also writes the obtained BAR space address information of each PF and the BAR space address information of each VF into the memory 3042 in a form of a BAR space address information table. The BAR space address information table shown in FIG. 4C records the BAR space address information of the PFs and the BAR space address information of the VFs. Similarly, FIG. 4C shows only the BAR space address information of PF0 and the BAR space address information of VF0 to VF63 associated with PF0. A form in which BAR space address information of PF1 to PF3 and BAR space address information of VFs associated with PF1 to PF3 are recorded is similar to the form in which the BAR space address information of PF0 and the BAR space address information of VF0 to VF63 associated with PF0 are recorded.

The embodiments of this application do not limit a specific form in which the BDF information or the BAR space address information is recorded. Another implementation, for example, an implementation in which BDF labels are indexed to establish a BDF information table, also falls within the scope of the embodiments of this application.

Step 406: The CPU (the CPU 301 or the CPU 302) enumerates the intermediate device 304, and sends, to the intermediate device 304, BDF information of each agent unit and BAR space address information of each agent unit that are obtained through enumeration.

The BDF information of each agent unit includes BDF information of each PF' and BDF information of each VF', and the BAR space address information of each agent unit includes BAR space address information of each PF' and BAR space address information of each VF'.

Optionally, the CPU (the CPU 301 or the CPU 302) may send the BDF information and the BAR space address information of each agent unit to the intermediate device 304 by using a TLP packet.

Further, the CPU 301 or the CPU 302 enumerates a plurality of PF's and a plurality of VF's when enumerating the intermediate device 304. For example, the CPU 301 enumerates a PFA' and a VFA' that support SR-IOV, and enumerates a PFB' and a VFB' that support Virtio.

In an implementation, the CPU 301 enumerates two PFA's supporting SR-IOV and 128 VFA's supporting SR-IOV, and enumerates two PFB's supporting Virtio and 128 VFB's supporting Virtio. The CPU 302 also enumerates two PFA's supporting SR-IOV and 128 VFA's supporting SR-IOV, and enumerates two PFB's supporting Virtio and 128 VFB's supporting Virtio. In this way, the CPU 301 enumerates 256 agent units supporting SR-IOV, and the CPU 302 enumerates 256 agent units supporting Virtio. Therefore, a quantity of agent units that need to be implemented in the intermediate device 204 is twice a quantity of function units in the network adapter 203.

For an implementation of obtaining information related to each PFA'/VFA' or obtaining information related to the PFB'/VFB' in the enumeration process, refer to an implementation of obtaining information related to a corresponding PF' or VP when the CPU 201 or the CPU 202 enumerates the intermediate device 204 in FIG. 2A. Details are not described again.

For example, the CPU may alternatively send the enumerated BDF information of each agent unit and the BAR space address information of each agent unit to the intermediate device 304 by using another packet other than the TLP packet, for example, another packet that can be used to transmit address information, or another packet that is used to transmit address information according to the UPI protocol.

Step 408 The intermediate device 304 stores, in the memory 3042, the BDF information of each agent unit and the BAR space address information of each agent unit that are received and are sent by the CPU (the CPU 301 or the CPU 302), and establishes a correspondence between an address of each agent unit and an address of each function unit in the network adapter 303.

Further, the intermediate device 304 may store the BDF information of each PF' (including the PFA' supporting SR-IOV and the PFB' supporting Virtio), the BDF information of each VF' (including the VFA' supporting SR-IOV and the VFB' supporting Virtio), the BAR space address of each PF', and the BAR space address information of each VF' in the memory 3042 based on a received TLP packet that is sent by the CPU (the CPU 301 or the CPU 302), and establish a correspondence between an address of each PF' and an address of each PF in the network adapter 303 and a correspondence between an address of each VF' and an address of each VF in the network adapter.

For example, after the CPU 301 sends address information of PF0A' and PF1A' that support SR-IOV, address information of VF0A' to VF63A' associated with PF0A', address information of VF64A' to VF127A' associated with PF1A' to the intermediate device 304 by using a TLP packet, the controller 3041 records information about PF0A', PF1A', VF0A' to VF63A', and VF64A' to VF127A' in the BDF information table and the BAR space address information table of the memory 3042, to establish a correspondence between an address of each PFA' and an address of each PF and a correspondence between an address of each VFA' and an address of each VF. VF0A' to VF127A' may separately correspond to the VM 0 to the VM 127, and may be separately used to implement forwarding of a data packet or a command packet in the VM 0 to the VM 127 that use the SR-IOV technology. FIG. 4D is a schematic diagram of a BDF information table between a PFA' and a PF and a BDF information table between a VFA' and a VF that are established by a controller 3041. FIG. 4E is a schematic diagram of a correspondence between a BAR space address of a PFA' and a BAR space address of a PF and a correspondence between a BAR space address of a VFA' and a BAR space address of a VF that are established by a controller 3041.

After the CPU 301 sends address information of PF0B' and PF1B' that support Virtio, address information of VF0B' to VF63B' associated with PF0B', address information of VF64B' to VF127B' associated with PF1B' to the intermediate device 304 by using a TLP packet, the controller 3041 records information about PF0B', PF1B', VF0B' to VF63B', and VF64B' to VF127B' in the BDF information table and the BAR space address information table of the memory 3042, to establish a correspondence between an address of each PFB' and an address of each PF and a correspondence between an address of each VFB' and an address of each VF. VF0B' to VF127B' may separately correspond to the VM 0 to the VM 127, and may be separately used to implement forwarding of a data packet or a command packet in the VM 0 to the VM 127 that use the Virtio technology. FIG. 4F is a schematic diagram of a BDF information table between a PFB' and a PF and a BDF information table between a VFB' and a VF that are established by a controller 3041. FIG. 4G is a schematic diagram of a BAR space address correspondence between a PFB' and a PF and a BAR space address correspondence between a VFB' and a VF that are established by a controller 3041.

It should be noted that FIG. 4D to FIG. 4G only schematically show a part of correspondences, and a correspondence between a PF' and a PF and a correspondence between a VF' and a VF that are not shown in FIG. 4D to FIG. 4G are shown in a manner similar to that in the figures.

Similarly, the CPU 302 may send, to the intermediate device 304 by using a TLP packet, address information of a PF' and a VF' that support SR-IOV and address information of a PF' and a VF' that support Virtio. The controller 3041 separately establishes and stores a correspondence between the PF' and the PF and a correspondence between the VF' and the VF in the BDF information table and the BAR space address information table of the memory 3042. Details are not described.

In the foregoing implementation, an example in which an agent unit (for example, a PFA' or a VFA') supporting SR-IOV and an agent unit (for example, a PFB' or a VFB') supporting Virtio are separately used as an agent of a same function unit (for example, a same PF or a same VF) in the network adapter 303 is used for description. In specific implementation, an agent unit (for example, a PFA' or a VFA') supporting SR-My and an agent unit (for example, a PFB' or a VFB') supporting Virtio may be alternatively used as agents of different function units (for example, different PFs or different VFs) in the network adapter 303. When there are enough function units in the network adapter 303, different agent units may be used as agents of different function units, to implement packet forwarding between the virtual machine and the network adapter. Optionally, when an agent unit (for example, a PFA' or a VFA') supporting SR-IOV and an agent unit (for example, a PFB' or a VFB') supporting Virtio are separately used as an agent of a same function unit (for example, a same PF or a same VF) in the network adapter 303, configuration and management of the agent unit can be simplified.

It should be noted that with reference to the implementations described in FIG. 4A to FIG. 4G, an implementation in which the intermediate device 304 establishes correspondences between addresses of a plurality of agent units (PF's or VF's) and addresses of a plurality of function units (PFs or VFs) is mainly described in FIG. 3. The intermediate device 304 in the server 300 shown in FIG. 3 can similarly implement, based on the established correspondences between the addresses of the plurality of agent units (the PF's or the VF's) and the addresses of the plurality of function units (the PFs or the VFs), packet forwarding between a virtual machine using the SR-IOV technology and the network adapter 303 and packet forwarding between a virtual machine using the Virtio technology and the network adapter 303. For a specific implementation, refer to the implementations of the server 200 in FIG. 2A to FIG. 2D. For example, for an implementation in which the CPU 301 enumerates the endpoint port 3043, refer to the foregoing implementation in which the CPU 201 enumerates the endpoint port 2043. For an implementation in which the CPU 302 enumerates the endpoint port 3044, refer to the foregoing implementation in which the CPU 202 enumerates the endpoint port 2044. For an implementation in which the intermediate device 304 enumerates the network adapter 303, refer to the foregoing implementation in which the intermediate device 204 enumerates the network adapter 203 in the foregoing embodiments. For an implementation of a channel control module 30411, refer to the implementation of the channel control module 20411 in the foregoing embodiments. For an implementation of a channel control module 30412, refer to the implementation of the channel control module 20412 in the foregoing embodiments. For an implementation of a conversion module 3046, refer to the implementation of the conversion module 2046 in the foregoing embodiments. Details are not described again.

Figure 5:
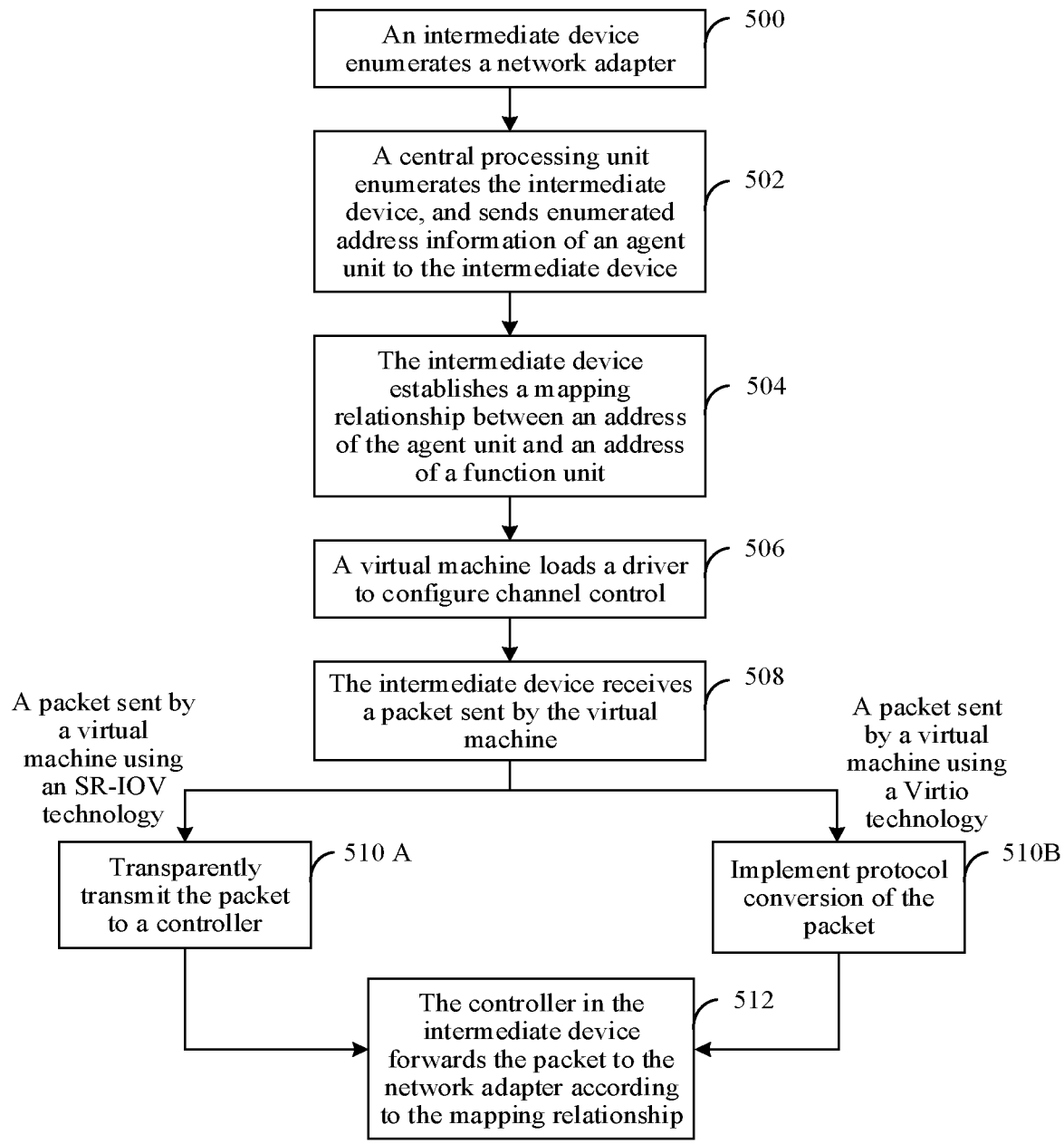
FIG. 5 is a schematic flowchart of a packet forwarding method according to an embodiment of this application.

FIG. 5 is a schematic flowchart of a packet forwarding method according to an embodiment of this application. For example, the method shown in FIG. 5 may be implemented by using the server 200 shown in FIG. 2A to FIG. 2D, or may be implemented by using the server 300 shown in FIG. 3. As shown in FIG. 5, the method further includes the following.

Step 500: An intermediate device enumerates a network adapter.

That the intermediate device enumerates the network adapter may be that the intermediate device serves as a root node of a PCIe topology structure to enumerate the network adapter, to obtain address information of a function unit in the network adapter. The function unit in the network adapter includes a PF and/or a VF.

Further, refer to the foregoing implementation in which the intermediate device 204 enumerates the network adapter 203 described in FIG. 2A to FIG. 2D, or refer to the foregoing implementation in which the intermediate device 304 enumerates the network adapter 303 described in FIG. 3.

Step 502: A CPU enumerates the intermediate device, and sends enumerated address information of an agent unit to the intermediate device.

That the CPU enumerates the intermediate device may be that the CPU serves as a root node of the PCIe topology structure to enumerate the intermediate device, to obtain address information of an agent unit in the intermediate device. The agent unit in the intermediate device includes a PFA' and/or a VFA' supporting SR-IOV, and a PFB' and/or a VFB' supporting Virtio. After obtaining the address information of the agent unit in the intermediate device through enumeration, the CPU sends the address information to the intermediate device. The PF' (the PFA' or the PFB') resource is an agent of a PF resource in the network adapter 203, and the VF' (the VFA' or the VFB') resource is an agent of a VF resource in the network adapter 203. Alternatively, the PF' (the PFA' or the PFB') resource is a virtual PF that is in the intermediate device 204 and that corresponds to the PF resource in the network adapter 203, and the VF' (the VFA' or the VFB') resource is a virtual VF that is in the intermediate device 204 and that corresponds to the VF resource in the network adapter 203.

Further, refer to the foregoing implementation in which the CPU (the CPU 201 or the CPU 202) enumerates the intermediate device 204 described in FIG. 2A to FIG. 2D, or refer to the foregoing implementation in which the CPU (the CPU 301 or the CPU 302) enumerates the intermediate device 304 described in FIG. 3.

Step 504: The intermediate device establishes a correspondence between an address of the agent unit and an address of the function unit.

The intermediate device establishes a correspondence between the address of the agent unit and the address of the function unit based on address information of the function unit in the network adapter that is obtained through enumeration and the address information of the agent unit that is sent by the CPU.

Further, refer to the foregoing implementation in which the intermediate device 204 establishes the correspondence described in FIG. 2A to FIG. 2D, or refer to the foregoing implementation in which the intermediate device 304 establishes the correspondence described in FIG. 3. For a correspondence table established by the intermediate device, refer to the correspondence tables shown in FIG. 4B to FIG. 4G.

Step 506: A virtual machine loads a network adapter driver to configure channel control.

After the virtual machine running in the CPU loads the network interface card driver, the network interface card driver of the virtual machine performs configuration of the channel control according to a virtualization technology that is used by the virtual machine. For example, when the virtual machine uses the SR-IOV technology, a network adapter driver of the virtual machine configures a channel control register as a path in which a sub-endpoint port supporting SR-IOV is located. When the virtual machine uses the Virtio technology, a network adapter driver of the virtual machine configures the channel control register to a path in which a sub-endpoint port supporting Virtio is located.

Further, for implementation of configuring the channel control, refer to the implementation of configuring the channel control module 20411 or the channel control module 20412 in FIG. 2B.

It should be noted that a virtualization technology used by the created virtual machine is selected by a user when the user creates the virtual machine. The user can select, based on a service requirement, a required virtualization technology (SR-IOV or Virtio) to create a virtual machine. After the virtual machine is created, a network adapter driver of the virtual machine configures a channel control register according to the virtualization technology selected by the user. For example, in FIG. 2A, the CPU 201 starts up to load a network adapter driver of the virtual machine, and a virtual machine manager in the server 200 controls, according to the Virtio technology used by the virtual machine 2011, the network adapter driver of the virtual machine 2011 to configure a corresponding channel control register.

Step 508: The intermediate device receives a packet sent by the virtual machine.

The intermediate device receives the packet sent by the virtual machine, and determines whether the to-be-forwarded packet is a packet sent by the virtual machine using the SR-IOV technology or a packet sent by the virtual machine using the Virtio technology. The server 200 shown in FIG. 2A is used as an example. After the intermediate device 204 receives the packet sent by the virtual machine 2011 using the Virtio technology, the PCIe switch 20431 forwards the packet through the sub-endpoint port 20433 based on a BDF number and/or a BAR space address carried in the packet. After the intermediate device 204 receives the packet sent by the virtual machine 2012 using the SR-IOV technology, the PCIe switch 20431 forwards the packet through the sub-endpoint port 20432 based on a BDF number and/or a BAR space address carried in the packet.

Step 510A: Transparently transmit the packet sent by the virtual machine using the SR-IOV technology to a controller.

The server 200 shown in FIG. 2A is used as an example. A packet sent by the virtual machine 2012 is forwarded to the sub-endpoint port 20432 by using the PCIe switch 20431, and the sub-endpoint port 20432 transparently transmits the packet to the controller 2041.

Step 510B: Implement protocol conversion of the packet sent by the virtual machine using the Virtio technology.

The server 200 shown in FIG. 2C is used as an example. A packet sent by the virtual machine 2011 is forwarded to the sub-endpoint port 20433 by using the PCIe switch 20431, and the sub-endpoint port 20433 forwards the packet to the conversion module 2046. The conversion module 2046 converts the Virtio protocol packet forwarded by the sub-endpoint port 20433 into a common DMA command packet or an NVMe packet, and sends the converted packet to the controller 2041.

For a manner in which the conversion module 2046 implements protocol conversion, refer to the foregoing manner in which the conversion module 2046 implements protocol conversion.

Step 512: The intermediate device forwards the packet to the network adapter according to the correspondence.

According to the correspondence established in step 504, the controller in the intermediate device replaces the address of the agent unit in the packet with the address of the function unit in the network adapter corresponding to the address of the agent unit, and sends the converted packet to the network adapter.

An implementation process in which the intermediate device forwards the packet sent by the network adapter to the virtual machine is reverse to the foregoing process in which the intermediate device forwards the packet sent by the virtual machine to the network adapter. For example, the intermediate device first replaces, according to the stored correspondence, an address of a function unit in the packet with an address of an agent unit in the intermediate device, and sends a packet that is sent by the network adapter to a virtual machine using the SR-IOV technology to a corresponding virtual machine through a corresponding sub-endpoint port. A packet sent by the network adapter to the virtual machine using the Virtio technology needs to be converted by the conversion module into a Virtio protocol packet, and then sent to a corresponding virtual machine through a corresponding sub-endpoint port. For example, for an implementation of protocol conversion of a packet, refer to the protocol conversion manners described in 1.2 and 2.2. For an implementation of channel selection, refer to the implementation of the channel control module 20411 or the channel control module 20412. Details are not described again.

According to the foregoing method, a CPU may load a virtual machine using the SR-IOV technology or a virtual machine using the Virtio technology in one server. This is a hybrid mode of creating virtual machines that support different virtualization technologies on one physical server. There is no need to configure two independent resource pools to separately support corresponding virtualization technologies, thereby implementing normalization of the resource pools. In addition, the intermediate device 204 is implemented by using hardware such as an FPGA, an ASIC, or an FPGA+ASIC, so that hardware offloading of Virtio protocol packet forwarding is implemented, not only forwarding performance is better than that in a Virtio protocol packet forwarding manner implemented by using software, but also occupied CPU resources may be reduced, and CPU resource utilization is improved.

In specific implementation, to effectively establish the correspondence, step 500 needs to be performed before step 502. The server 200 in FIG. 2A is used as an example. The intermediate device 204 and the network adapter 203 are powered on first when the server 200 is started up, and the intermediate device 204 performs PCIe enumeration on the network adapter 203. After PF information and VF information in the network adapter 203 are obtained, the CPU (the CPU 201 or the CPU 202) is powered on, and an enumeration process for the intermediate device 204 is started. In this way, the intermediate device 204 can configure corresponding PF' and VF' resources based on resource conditions of the PF and the VF in the network adapter 203. For example, a manner in which the intermediate device 204 and the network adapter 203 are powered on first and the CPU (the CPU 201 or the CPU 202) is powered on later when the server 200 is started up includes but is not limited to a manner in which power supplies of the intermediate device 204 and the network adapter 203 are disposed separately from a power supply of the CPU (the CPU 201 or the CPU 202), and then the intermediate device 204 and the network adapter 203 powered on first and the CPU is powered on later, or a circuit control device such as a complex programmable logic device (CPLD) is used to control the intermediate device 204 and the network adapter 203 to be powered on first and control the CPU (the CPU 201 or CPU 202) to be powered on later. This embodiment of this application does not limit a specific implementation.

It should be noted that the foregoing description is performed when a resource pool normalization method is implemented by using the SR-IOV technology and the Virtio technology as different virtualization technologies. For an implementation in which another virtualization technology is used, provided that there are implementations of resource pool normalization by using two different virtual machine technologies, refer to the foregoing implementations in the embodiments of this application. Details are not described again.

Figure 6A:
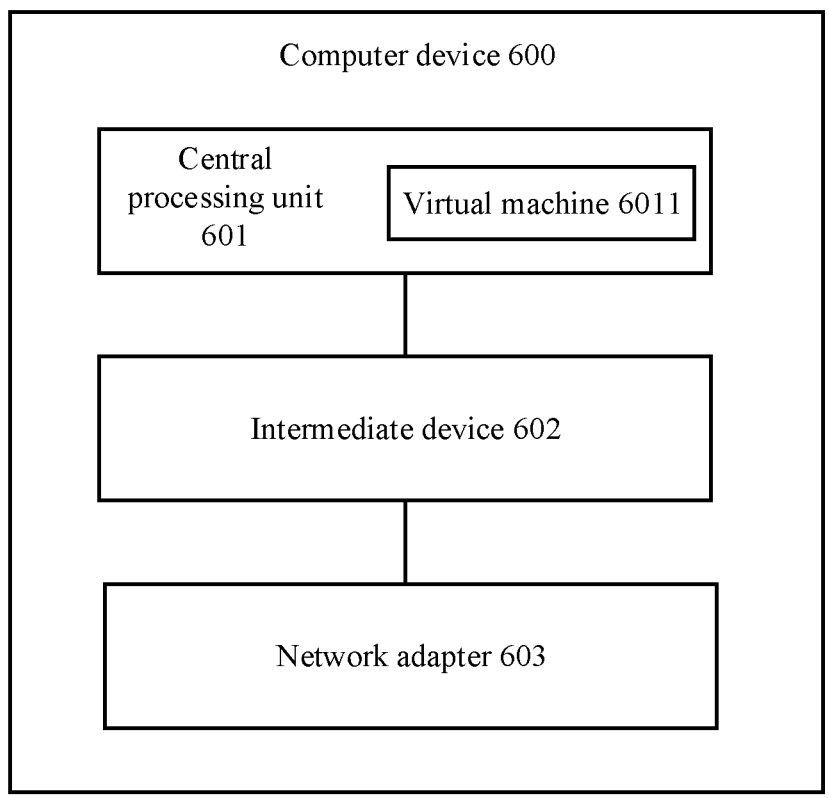
FIG. 6A is a schematic diagram of a structure of a computer device according to an embodiment of this application.

FIG. 6A is a schematic diagram of a structure of a computer device 600 according to an embodiment of this application. As shown in FIG. 6A, the computer device 600 includes a CPU 601, an intermediate device 602, and a network adapter 603. The intermediate device 602 is connected to both the CPU 601 and the network adapter 603 through a bus. The CPU 601 supports running a virtual machine 6011. The network adapter 603 includes a plurality of function units generated based on a virtualization technology.

The CPU 601 is configured to obtain, by enumerating the intermediate device 602, information about a first agent unit supporting SR-IOV and information about a second agent unit supporting Virtio in the intermediate device 602, and separately allocate address information to the first agent unit and the second agent unit. The first agent unit is an agent of a first function unit in the network adapter, the second agent unit is an agent of a second function unit in the network adapter, and the first function unit and the second function unit are a same function unit or different function units in the network adapter.

The intermediate device 602 is configured to allocate address information to the first function unit and the second function unit in the network adapter 603 by enumerating the network adapter 603, establish a correspondence between the address information of the first agent unit and the address information of the first function unit, and establish a correspondence between the address information of the second agent unit and the address information of the second function unit.

When the virtual machine 6011 uses an SR-IOV technology, the intermediate device 602 is configured to implement packet forwarding between the virtual machine 6011 and the network adapter 603 according to the correspondence between the address information of the first agent unit and the address information of the first function unit, or when the virtual machine 6011 uses a Virtio technology, the intermediate device 602 is configured to implement packet forwarding between the virtual machine 6011 and the network adapter 603 according to the correspondence between the address information of the second agent unit and the address information of the second function unit.

The intermediate device 602 in the computer device 600 may include the first agent unit supporting SR-IOV and the second agent unit supporting Virtio, the first agent unit is the agent of the first function unit, the second agent unit is the agent of the second function unit, and the first function unit and the second function unit are a same function unit or different function units in the network adapter. In this way, the virtual machine 6011 may use the SR-IOV technology or the Virtio technology, and there is no need to configure two sets of independent resource pools to separately support corresponding virtualization technologies, to implement normalization of resource pools. In addition, the intermediate device 602 may be a chip, for example, an FPGA, an ASIC, or an FPGA+ASIC, and is connected to both the CPU 601 and the network adapter 603, to implement hardware offloading of Virtio protocol packet forwarding, so that not only forwarding performance is better than that in a forwarding manner implemented by using software, but also occupied resources of the CPU 601 may be reduced, and resource utilization of the CPU 601 may be improved.

Figure 6B:
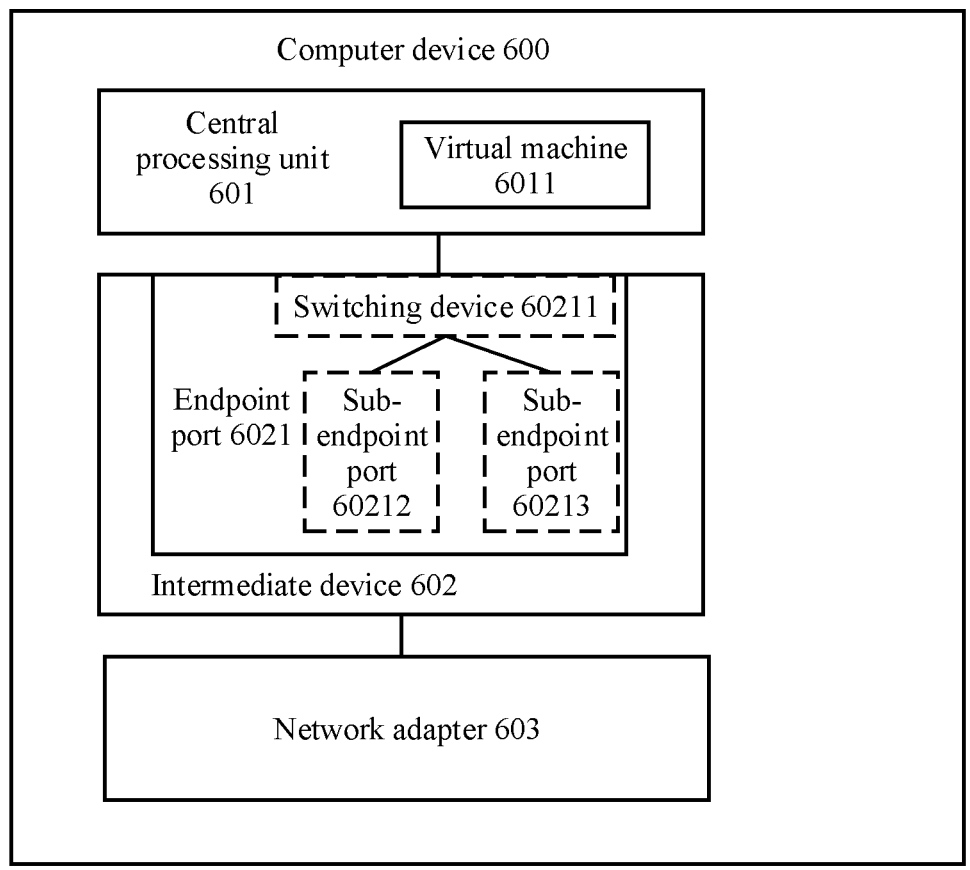
FIG. 6B is a schematic diagram of another structure of the computer device according to an embodiment of this application.
Figure 6C:
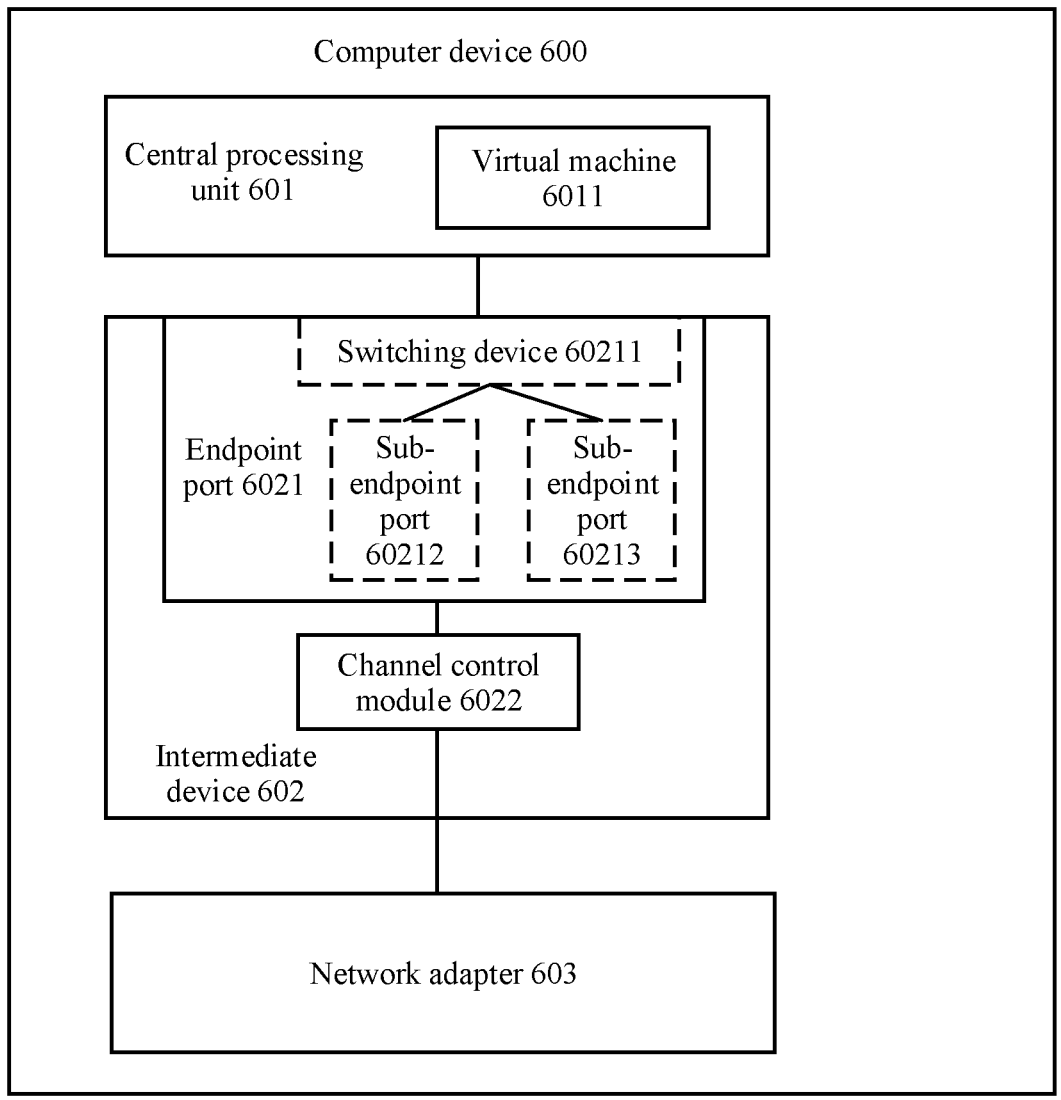
FIG. 6C is a schematic diagram of still another structure of the computer device according to an embodiment of this application.

In an implementation, as shown in FIG. 6B, the intermediate device 602 further includes an endpoint port 6021, the intermediate device 602 is connected to the CPU 601 through the endpoint port 6021, the endpoint port 6021 includes a switching device 60211, a sub-endpoint port 60212, and a sub-endpoint port 60213, and the sub-endpoint port 60212 and the sub-endpoint port 60213 each are connected to a downlink port of the switching device 60211.

The CPU 601 is further configured to obtain information about the switching device 60211 through enumeration, obtain the information about the first agent unit by enumerating the sub-endpoint ports 60212, and obtain the information about the second agent unit by enumerating the sub-endpoint ports 60213.

In an implementation, the switching device 60211 is configured to receive a first packet sent by the virtual machine 6011, and select, based on address information in the first packet, one of the sub-endpoint port 60212 and the sub-endpoint port 60213 to forward the first packet.

In an implementation, the intermediate device 602 further includes a channel control module 6022. The channel control module 6022 is configured to control a forwarding path when the network adapter 603 sends a second packet to the virtual machine 6011.

When the virtual machine 6011 uses the SR-IOV technology, the channel control module 6022 determines a path including the sub-endpoint port 60212 as a path for forwarding the second packet, or when the virtual machine 6011 uses the Virtio technology, the channel control module 6022 determines a path including the sub-endpoint port 60213 as a path for forwarding the second packet.

Figure 6D:
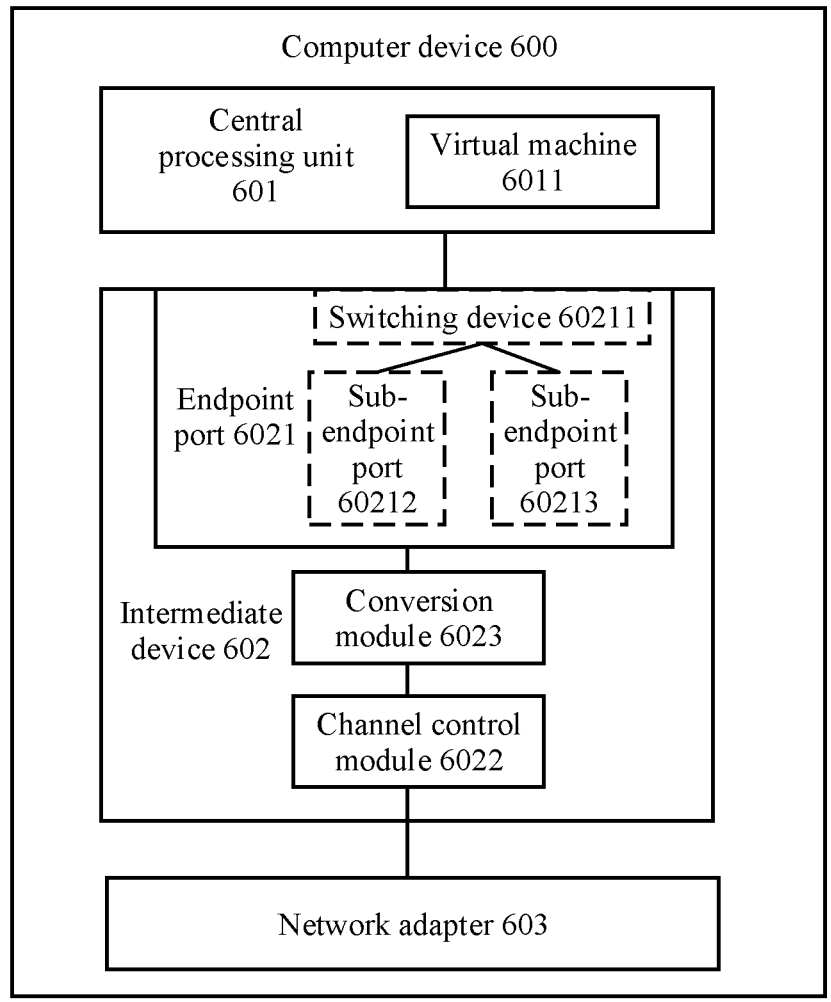
FIG. 6D is a schematic diagram of still another structure of the computer device according to an embodiment of this application.

In an implementation, as shown in FIG. 6D, the intermediate device 602 further includes a conversion module 6023.

The conversion module 6023 is configured to convert a packet sent by the virtual machine 6011 using the Virtio technology into a packet of a forwarding protocol between the intermediate device 602 and the network adapter 603, or convert a packet sent by the network adapter 603 to the virtual machine 6011 using the Virtio technology into a packet supporting a Virtio protocol.

In an implementation, the computer device further includes a CPU 604 (not shown in the figure), and the CPU 604 supports running a virtual machine 6041.

The CPU 604 is connected to both the CPU 601 and the intermediate device 602 through the bus.

The CPU 604 is configured to obtain, by enumerating the intermediate device 602, information about a third agent unit supporting SR-IOV and information about a fourth agent unit supporting Virtio in the intermediate device 602, and separately allocate address information to the third agent unit and the fourth agent unit. The third agent unit is an agent of a third function unit in the network adapter, the fourth agent unit is an agent of a fourth function unit in the network adapter, and the third function unit and the fourth function unit are a same function unit or different function units in the network adapter.

The intermediate device 602 is further configured to allocate address information to the third function unit in the network adapter 603, establish a correspondence between the address information of the third agent unit and the address information of the third function unit, and establish a correspondence between the address information of the fourth agent unit and the address information of the fourth function unit.

When the virtual machine 6041 uses the SR-IOV technology, the intermediate device 602 is configured to implement packet forwarding between the virtual machine 6041 and the network adapter 603 according to the correspondence between the address information of the third agent unit and the address information of the third function unit, or when the virtual machine 6041 uses the Virtio technology, the intermediate device 602 is configured to implement packet forwarding between the virtual machine 6041 and the network adapter 603 according to the correspondence between the address information of the fourth agent unit and the address information of the fourth function unit.

In an implementation, the intermediate device 602 is further configured to configure the information about the first agent unit in the sub-endpoint port 60212 based on information about the first function unit, and configure the information about the second agent unit in the sub-endpoint port 60213 based on information about the second function unit.

In an implementation, the address information of the first function unit includes BDF information of the first function unit and BAR space address information of the first function unit.

The address information of the second function unit includes BDF information of the second function unit and BAR space address information of the second function unit.

The address information of the first agent unit includes BDF information of the first agent unit and BAR space address information of the first agent unit.

The address information of the second agent unit includes BDF information of the second agent unit and BAR space address information of the second agent unit.

In an implementation, the network adapter 603 supports an SR-IOV function, and the first function unit includes a first physical function or a first virtual function.

For a specific implementation of the computer device 600 shown in FIG. 6A to FIG. 6D, refer to the implementation of the server 200 in FIG. 2A to FIG. 2D and the implementation of the server 300 in FIG. 3. For example, for an implementation of the intermediate device 602, refer to the implementation of the intermediate device 204 in FIG. 2A to FIG. 2D, or refer to the implementation of the intermediate device 304 in FIG. 3. For an implementation of the endpoint port 6021, refer to the implementation of the endpoint port 2043 or the endpoint port 2044 in FIG. 2A to FIG. 2D, or refer to the implementation of the endpoint port 3043 or the endpoint port 3044 in FIG. 3. For an implementation of the channel control module 6022, refer to the implementation of the channel control module 20411 or the channel control module 20412 in FIG. 2A to FIG. 2D, or refer to the implementation of the channel control module 30411 or the channel control module 30412 in FIG. 3. For an implementation of the conversion module 6023, refer to the implementation of the conversion module 2046 in FIG. 2A to FIG. 2D, or refer to the implementation of the conversion module 3046 in FIG. 3. For an implementation of the CPU 601, refer to the implementation of the CPU 201 in FIG. 2A to FIG. 2D, or refer to the implementation of the CPU 301 in FIG. 3. For an implementation of the CPU 604, refer to the implementation of the CPU 202 in FIG. 2A to FIG. 2D, or refer to the implementation of the CPU 302 in FIG. 3. For an implementation of the network adapter 603, refer to the implementation of the network adapter 203 in FIG. 2A to FIG. 2D, or refer to the implementation of the network adapter 303 in FIG. 3. In addition, for an implementation of the first function unit in the embodiments described in FIG. 6A to FIG. 6D, refer to the implementation of the PF and/or the VF provided in FIG. 2A to FIG. 2D or in FIG. 3. For an implementation of the first agent unit, refer to the implementation of the PFA' and/or the VFA' provided in FIG. 2A to FIG. 2D or in FIG. 3. For an implementation of the second agent unit, refer to the implementation of the PFB' and/or the VFB' provided in FIG. 2A to FIG. 2D or in FIG. 3. Details are not described.

It may be understood that, when the intermediate device 602 is implemented by using an FPGA chip, the FPGA chip may include a controller and a memory, and may further include a channel control module and a conversion module. When the intermediate device 602 is implemented by an ASIC chip, a function of the controller may be implemented by using the ASIC chip, and a function of the memory may be implemented by a memory (such as a RAM) connected to the ASIC chip. For example, when the intermediate device 602 is implemented by an ASIC, the function of the controller may be implemented by the ASIC, and the function of the memory may be implemented by a memory connected to the ASIC, when the intermediate device 602 is implemented by an FPGA+ASIC, the function of the controller may be implemented by an ASIC, and the function of the memory may be implemented by an FPGA, or when the intermediate device 602 is implemented by an FPGA+ASIC, the function of the controller may be implemented by both the FPGA and the ASIC, and the function of the memory may be implemented by the FPGA. Details are not described.

Figure 7A:
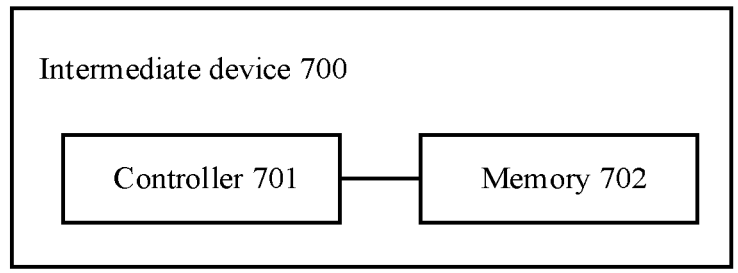
FIG. 7A is a schematic diagram of a structure of an intermediate device according to an embodiment of this application.

FIG. 7A is a schematic diagram of a structure of an intermediate device 700 according to an embodiment of this application. The intermediate device 700 is connected to both a first CPU and a network adapter in a computer device through a bus, the first CPU supports running a first virtual machine, and the intermediate device 700 includes a controller 701 and a memory 702.

The controller 701 is configured to obtain information about a first function unit and information about a second function unit in the network adapter, separately allocate addresses to the first function unit and the second function unit, obtain address information of a first agent unit and address information of a second agent unit, and establish a correspondence between the address information of the first agent unit and address information of the first function unit and a correspondence between the address information of the second agent unit and address information of the second function unit. The first function unit and the second function unit are a same function unit or different function units generated based on a virtualization technology in the network adapter, the first agent unit supports an SR-IOV technology and is an agent of the first function unit, and the second agent unit supports a Virtio technology and is an agent of the second function unit.

The memory 702 is configured to store the correspondence between the address information of the first agent unit and the address information of the first function unit and the correspondence between the address information of the second agent unit and the address information of the second function unit.

The controller 701 is further configured to when the first virtual machine uses the SR-IOV technology, implement packet forwarding between the first virtual machine and the network adapter according to the correspondence between the address information of the first agent unit and the address information of the first function unit, or when the first virtual machine uses the Virtio technology, implement packet forwarding between the first virtual machine and the network adapter according to the correspondence between the address information of the second agent unit and the address information of the second function unit.

The intermediate device 700 may include the first agent unit supporting SR-IOV and the second agent unit supporting Virtio, the first agent unit is the agent of the first function unit, the second agent unit is the agent of the second function unit, and the first function unit and the second function unit are the same function unit or different function units in the network adapter. In this way, the intermediate device 700 may forward packets sent and received by a virtual machine that uses the SR-IOV technology, and may also forward packets sent and received by a virtual machine that uses the Virtio technology, to implement normalization of resource pools. In addition, the intermediate device 700 is connected to both the first CPU and the network adapter in the computer device through the bus, to implement hardware offloading of Virtio protocol packet forwarding, so that not only forwarding performance is better than that in a forwarding manner implemented by using software, but also occupied CPU resources may be reduced, and CPU resource utilization may be improved.

Optionally, the intermediate device 700 may be implemented by a device, for example, an FPGA, an ASIC, or an FPGA+ASIC.

Figure 7B:
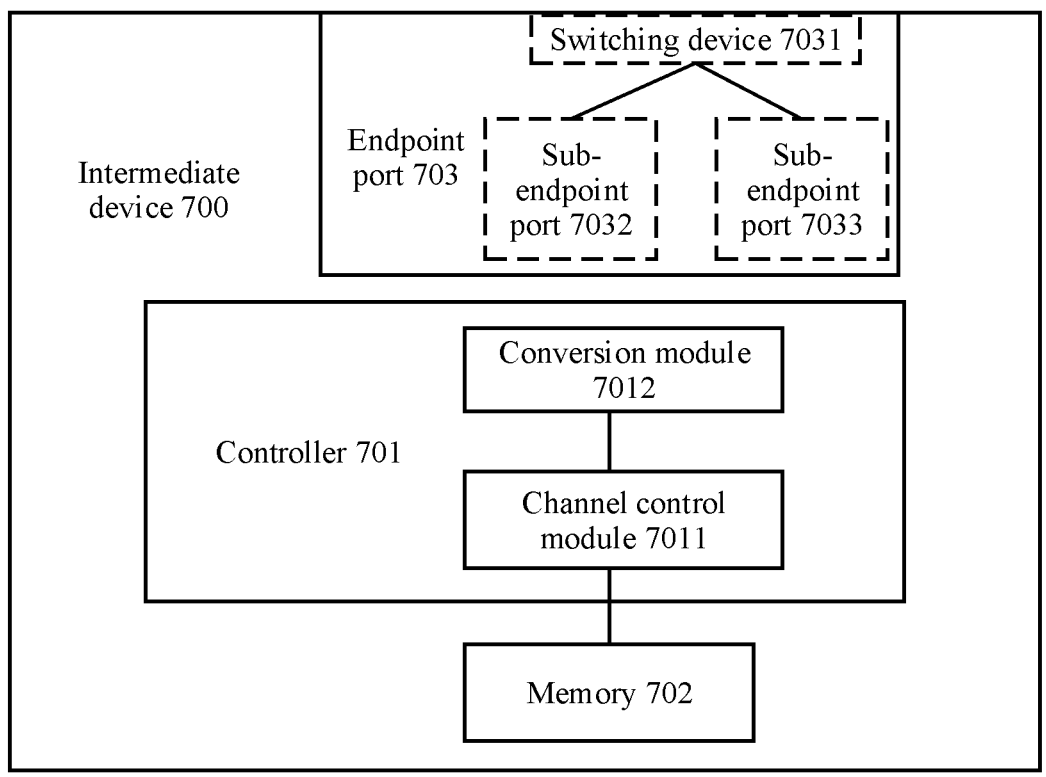
FIG. 7B is a schematic diagram of a structure of another intermediate device according to an embodiment of this application.

As shown in FIG. 7B, in an optional implementation, the intermediate device 700 further includes an endpoint port 703, the intermediate device is connected to the first CPU through the endpoint port 703, the endpoint port 703 includes a switching device 7031, a sub-endpoint port 7032, and a sub-endpoint port 7033, and the sub-endpoint port 7032 and the sub-endpoint port 7033 each are connected to a downlink port of the switching device 7031.

The sub-endpoint port 7032 includes the information about the first agent unit, and the sub-endpoint port 7033 includes the information about the second agent unit.

In an optional implementation, the switching device 7031 is configured to receive a first packet sent by the first virtual machine, and select, based on address information in the first packet, one of the sub-endpoint port 7032 and the sub-endpoint port 7033 to forward the first packet.

In an optional implementation, the intermediate device 700 further includes a channel control module 7011.

The channel control module 7011 is configured to control a forwarding path when the network adapter sends a second packet to the first virtual machine.

When the first virtual machine uses the SR-IOV technology, the channel control module 7011 determines a path including the first sub-endpoint port as a path for forwarding the second packet, or when the first virtual machine uses the Virtio technology, the channel control module 7011 determines a path including the second sub-endpoint port as a path for forwarding the second packet.

In an optional implementation, the intermediate device 700 further includes a conversion module 7012.

The conversion module 7012 is configured to convert a packet sent by the first virtual machine using the Virtio technology into a packet of a forwarding protocol between the intermediate device 700 and the network adapter, or convert a packet sent by the network adapter to the first virtual machine using the Virtio technology into a packet supporting Virtio.

For a specific implementation of the intermediate device 700, refer to the implementation of the intermediate device 204 in FIG. 2A to FIG. 2D and the implementation of the intermediate device 304 in FIG. 3. For an implementation of the endpoint port 703, refer to the implementation of the endpoint port 2043 or the endpoint port 2044 in FIG. 2A to FIG. 2D, or refer to the implementation of the endpoint port 3043 or the endpoint port 3044 in FIG. 3. For an implementation of the channel control module 7011, refer to the implementation of the channel control module 20411 or the channel control module 20412 in FIG. 2A to FIG. 2D, or refer to the implementation of the channel control module 30411 or the channel control module 30412 in FIG. 3. For an implementation of the conversion module 7012, refer to the implementation of the conversion module 2046 in FIG. 2A to FIG. 2D, or refer to the implementation of the conversion module 3046 in FIG. 3. For an implementation of the first function unit described in the implementation of the intermediate device 700, refer to the implementation of the PF and/or the VF provided in FIG. 2A to FIG. 2D or in FIG. 3. For an implementation of the first agent unit, refer to the implementation of the PFA' and/or the VFA' provided in FIG. 2A to FIG. 2D or in FIG. 3. For an implementation of the second agent unit, refer to the implementation of the PFB' and/or the VFB' provided in FIG. 2A to FIG. 2D or in FIG. 3. Details are not described.

It can be understood that FIG. 7A or FIG. 7B is a schematic diagram of a structure of the intermediate device 700 implemented by an FPGA chip. When the intermediate device 700 is implemented by an ASIC chip, a function of the controller 701 may be implemented by the ASIC chip, and a function of the memory 702 may be implemented by a memory (such as a RAM) connected to the ASIC chip. For example, when the intermediate device 700 is implemented by an ASIC, the function of the controller 701 may be implemented by the ASIC, and the function of the memory 702 may be implemented by a memory connected to the ASIC, when the intermediate device 700 is implemented by an FPGA+ASIC, the function of the controller 701 may be implemented by an ASIC, and the function of the memory 702 may be implemented by an FPGA, or when the intermediate device 700 is implemented by an FPGA+ASIC, the function of the controller 701 may be implemented by both the FPGA and the ASIC, and the function of the memory 702 may be implemented by the FPGA. Details are not described.

Figure 8:
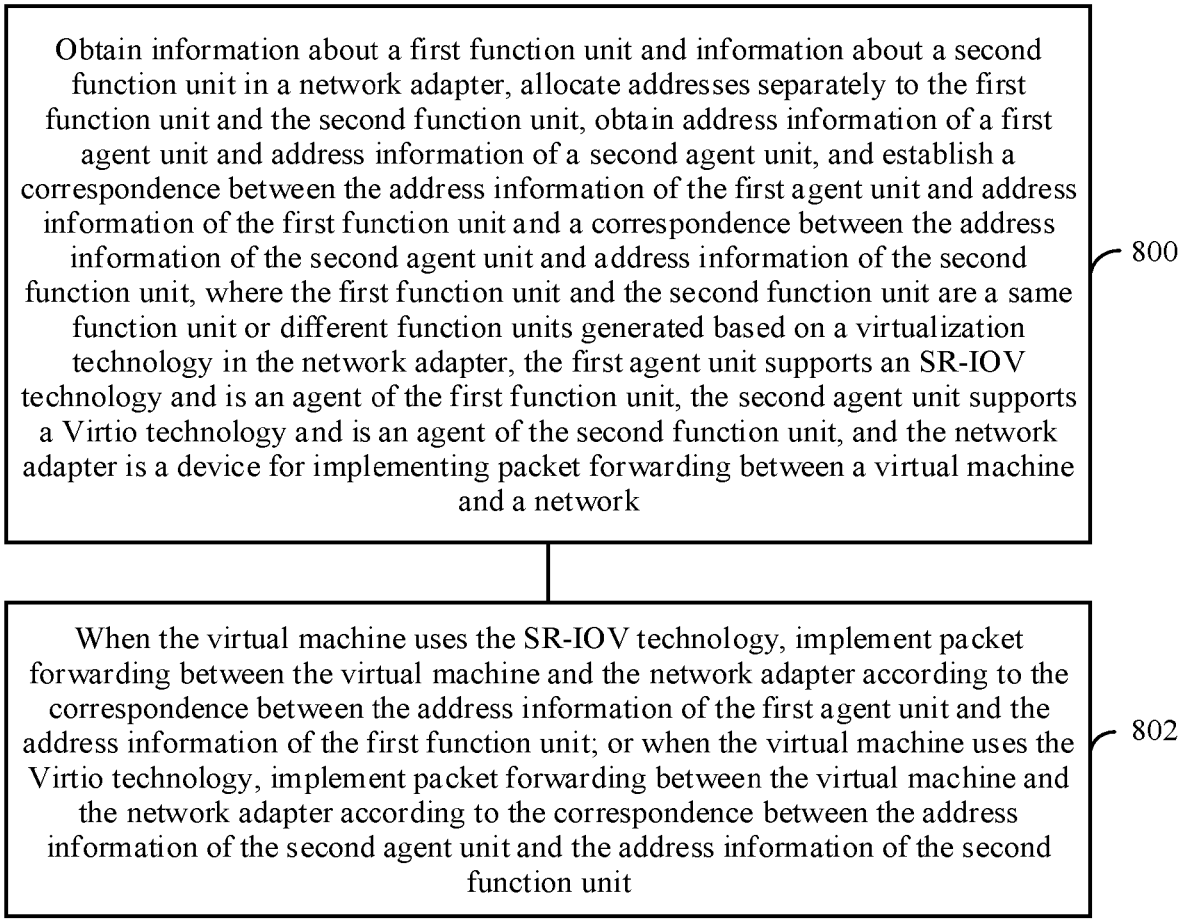
FIG. 8 is a schematic flowchart of another packet forwarding method according to an embodiment of this application.

FIG. 8 is a schematic flowchart of another packet forwarding method according to an embodiment of this application. As shown in FIG. 8, the method includes Step 800: Obtain information about a first function unit and information about a second function unit in a network adapter, separately allocate addresses to the first function unit and the second function unit, obtain address information of a first agent unit and address information of a second agent unit, and establish a correspondence between the address information of the first agent unit and address information of the first function unit and a correspondence between the address information of the second agent unit and address information of the second function unit. The first function unit and the second function unit are a same function unit or different function units generated based on a virtualization technology in the network adapter, the first agent unit supports an SR-IOV technology and is an agent of the first function unit, the second agent unit supports a Virtio technology and is an agent of the second function unit, and the network adapter is a device for implementing packet forwarding between a virtual machine and a network.

Step 802: When the virtual machine uses the SR-IOV technology, implement packet forwarding between the virtual machine and the network adapter according to the correspondence between the address information of the first agent unit and the address information of the first function unit, or when the virtual machine uses the Virtio technology, implement packet forwarding between the virtual machine and the network adapter according to the correspondence between the address information of the second agent unit and the address information of the second function unit.

In the foregoing method, the virtual machine may use the SR-IOV technology or the Virtio technology, and there is no need to configure two sets of independent resource pools to separately support corresponding virtualization technologies, to implement normalization of resource pools. In addition, hardware offloading of Virtio protocol packet forwarding can be implemented, so that not only forwarding performance is better than that in a forwarding manner implemented by using software, but also occupied CPU resources may be reduced, and CPU resource utilization may be improved.

In an implementation, the obtaining the information about the first function unit in the network adapter includes obtaining the information about the first function unit in the network adapter by enumerating the network adapter.

In an implementation, the obtaining the information about the second function unit in the network adapter includes obtaining information about the second function unit in the network adapter by enumerating the network adapter.

In an implementation, the method further includes separately configuring information about the first agent unit and information about the second agent unit in different sub-endpoint ports based on information about function units.

In an implementation, the address information includes BDF information and BAR space address information.

Further, the foregoing method may be implemented by the intermediate device 204 in FIG. 2A to FIG. 2D or the intermediate device 304 in FIG. 3. That is, refer to the method procedure shown in FIG. 8 that is implemented by the intermediate device 204 in FIG. 2A to FIG. 2D or the intermediate device 304 in FIG. 3. In addition, for an implementation of the function units described in the implementations shown in FIG. 8, refer to the implementation of the PF and/or the VF provided in FIG. 2A to FIG. 2D or in FIG. 3. For an implementation of the first agent unit, refer to the implementation of the PFA' and/or the VFA' provided in FIG. 2A to FIG. 2D or in FIG. 3. For an implementation of the second agent unit, refer to the implementation of the PFB' and/or the VFB' provided in FIG. 2A to FIG. 2D or in FIG. 3. Details are not described.

Figure 9:
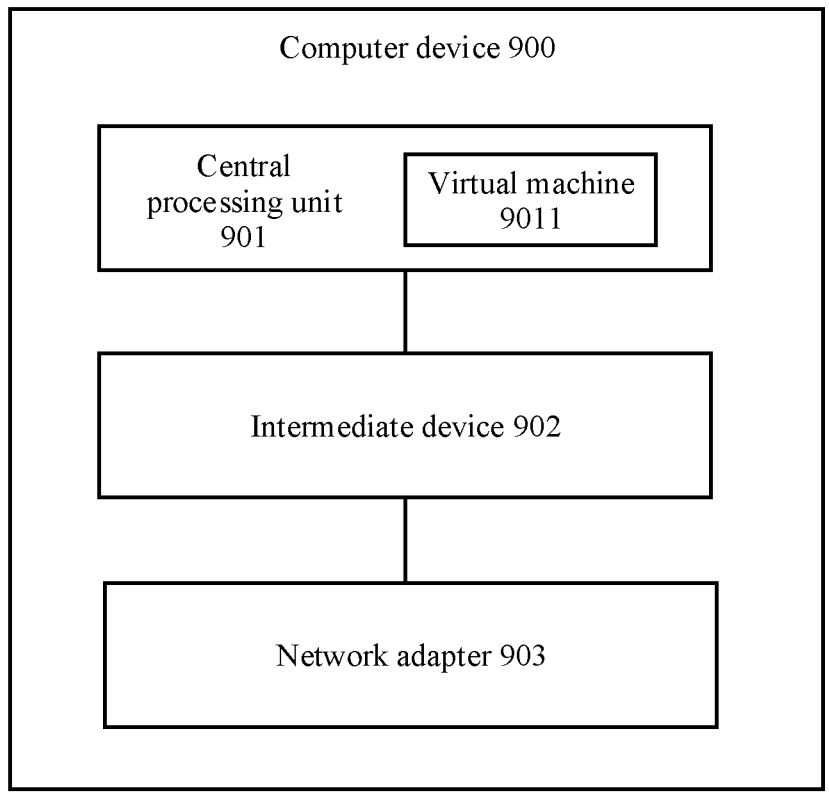
FIG. 9 is a schematic diagram of a structure of another computer device according to an embodiment of this application.

FIG. 9 is a schematic diagram of a structure of another computer device 900 according to an embodiment of this application. As shown in FIG. 9, the computer device 900 includes a CPU 901, an intermediate device 902, and a network adapter 903. The intermediate device 902 is connected to both the CPU 901 and the network adapter 903 through a bus. The CPU 901 supports running a first virtual machine. The first virtual machine supports an SR-IOV technology, or the first virtual machine supports a Virtio technology.

The intermediate device 902 is configured to receive a first packet sent by the first virtual machine, and forward the first packet to the network adapter 903.

Alternatively, the intermediate device 902 is configured to receive a second packet sent by the network adapter 903, and forward the second packet to the first virtual machine.

The first virtual machine in the computer device 900 may use the SR-IOV technology or the Virtio technology, and there is no need to configure two sets of independent resource pools to separately support corresponding virtualization technologies, to implement normalization of resource pools. In addition, the intermediate device 902 is connected to both the CPU 901 and the network adapter 903 through the bus, to implement hardware offloading of Virtio protocol packet forwarding, so that not only forwarding performance is better than that in a forwarding manner implemented by using software, but also occupied resources of the CPU 901 may be reduced, and resource utilization of the CPU 901 may be improved.

Optionally, the intermediate device 902 may be implemented by a device, for example, an FPGA, an ASIC, or an FPGA+ASIC.

Optionally, the packet includes a data packet or a command packet. The data packet includes but is not limited to data to be read or written, and the command packet includes but is not limited to a control command or a control message to be sent.

Optionally, the bus may be a PCIe bus or a UPI bus. When the bus is a PCIe bus, the intermediate device 902 serves as a root node of a PCIe and discovers the network adapter 903 through PCIe enumeration.

Optionally, the first virtual machine may be configured to use the SR-IOV technology, or may be configured to use the Virtio technology. A virtualization technology configured for the first virtual machine may be configured by a function unit (for example, a virtual machine manager) in the computer device according to a received configuration instruction of a user. It may be understood that, at a same moment, the first virtual machine supports only one virtualization technology.

Optionally, the computer device further includes a CPU 904 (not shown in the figure). The intermediate device 902 is connected to both the CPU 904 and the network adapter 903 through a bus, and the CPU 904 supports running a second virtual machine. The second virtual machine supports an SR-IOV technology, or the second virtual machine supports a Virtio technology.

The intermediate device 902 is configured to receive a third packet sent by the second virtual machine, and forward the third packet to the network adapter 903.

The intermediate device 902 is configured to receive a fourth packet sent by the network adapter 903, and forward the fourth packet to the second virtual machine.

Optionally, the CPU 901 and the CPU 904 share the network adapter. That the CPU 901 and the CPU 904 share the network adapter is that the CPU 901 and the CPU 904 each are communicatively connected to a network via the network adapter.

For a specific implementation of the computer device 900 shown in FIG. 9, refer to the implementation of the server 200 in FIG. 2A to FIG. 2D and the implementation of the server 300 in FIG. 3. For example, for an implementation of the intermediate device 902, refer to the implementation of the intermediate device 204 in FIG. 2A to FIG. 2D, or refer to the implementation of the intermediate device 304 in FIG. 3. For an implementation of the CPU 901, refer to the implementation of the CPU 201 in FIG. 2A to FIG. 2D, or refer to the implementation of the CPU 301 in FIG. 3. For an implementation of the network adapter 903, refer to the implementation of the network adapter 203 in FIG. 2A to FIG. 2D, or refer to the implementation of the network adapter 303 in FIG. 3. Details are not described.

It may be understood that, when the intermediate device 902 is implemented by using an FPGA chip, the FPGA chip may include a controller and a memory, and may further include a channel control module and a conversion module. When the intermediate device 902 is implemented by an ASIC chip, a function of the controller may be implemented by using the ASIC chip, and a function of the memory may be implemented by a memory (such as a RAM) connected to the ASIC chip. For example, when the intermediate device 902 is implemented by an ASIC, the function of the controller may be implemented by the ASIC, and the function of the memory may be implemented by a memory connected to the ASIC, when the intermediate device 902 is implemented by an FPGA+ASIC, the function of the controller may be implemented by an ASIC, and the function of the memory may be implemented by an FPGA, or when the intermediate device 902 is implemented by an FPGA+ASIC, the function of the controller may be implemented by both the FPGA and the ASIC, and the function of the memory may be implemented by the FPGA. Details are not described.

Figure 10:
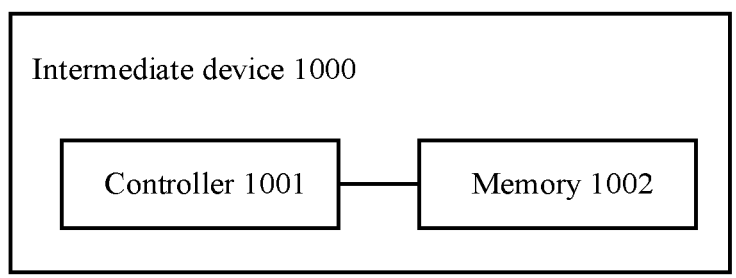
FIG. 10 is a schematic diagram of a structure of another intermediate device according to an embodiment of this application.

FIG. 10 is a schematic diagram of a structure of another intermediate device 1000 according to an embodiment of this application. As shown in FIG. 10, the intermediate device 1000 includes a controller 1001 and a memory 1002. The intermediate device 1000 is connected to both a first CPU and a network adapter in a computer device through a bus. The first CPU supports running a first virtual machine. The first virtual machine supports an SR-IOV technology, or the first virtual machine supports a Virtio technology.

The memory 1002 is configured to store an address correspondence for implementing packet forwarding.

The controller 1001 is configured to receive a first packet sent by the first virtual machine, and forward the first packet to the network adapter according to the address correspondence, or the controller 1001 is configured to receive a second packet sent by the network adapter, and forward the second packet to the first virtual machine according to the address correspondence.

In this way, the intermediate device 1000 may forward packets sent and received by a virtual machine that uses the SR-IOV technology, and may also forward packets sent and received by a virtual machine that uses the Virtio technology, to implement normalization of resource pools. In addition, the intermediate device is connected to both the first CPU and the network adapter in the computer device through the bus, to implement hardware offloading of Virtio protocol packet forwarding, so that not only forwarding performance is better than that in a forwarding manner implemented by using software, but also occupied CPU resources may be reduced, and CPU resource utilization may be improved.

Optionally, the intermediate device 1000 may be implemented by a device, for example, an FPGA, an ASIC, or an FPGA+ASIC.

For a specific implementation of the intermediate device 1000, refer to the implementation of the intermediate device 204 in FIG. 2A to FIG. 2D and the implementation of the intermediate device 304 in FIG. 3. Details are not described.

It can be understood that FIG. 10 is a schematic diagram of a structure of the intermediate device 1000 implemented by an FPGA chip. When the intermediate device 1000 is implemented by the ASIC chip, a function of the controller 1001 may be implemented by the ASIC chip, and a function of the memory 1002 may be implemented by a memory (such as a RAM) connected to the ASIC chip. For example, when the intermediate device 1000 is implemented by an ASIC, the function of the controller 1001 may be implemented by the ASIC, and the function of the memory 1002 may be implemented by a memory connected to the ASIC, when the intermediate device 1000 is implemented by an FPGA+ASIC, the function of the controller 1001 may be implemented by an ASIC, and the function of the memory 1002 may be implemented by an FPGA, or when the intermediate device 1000 is implemented by an FPGA+ASIC, the function of the controller 1001 may be implemented by both the FPGA and the ASIC, and the function of the memory 1002 may be implemented by the FPGA. Details are not described.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed in a hardware or software manner depends on particular applications and design constraint conditions of the technical solutions. A person skilled in the art may use different methods to implement the described functions for each particular application, but it should not be considered that the implementation goes beyond the scope of the present disclosure.

In the several embodiments provided in this application, it should be understood that the disclosed computer device and method may be implemented in another manner. For example, the foregoing apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments of the present disclosure.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of the present disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a read-only memory (ROM), a RAM, a magnetic disk, or an optical disc.

The foregoing descriptions are merely specific implementations of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A computer device comprising:
    a bus;
    an intermediate device coupled to the bus;
    a network adapter coupled to the intermediate device through the bus and comprising:
        a first function component based on a virtualization technology, wherein the first function component comprises a first agent component configured to support single-root input/output (I/O) virtualization (SR-IOV); and
        a second function component based on the virtualization technology, wherein the second function component comprises a second agent component configured to support Virtio in the intermediate device; and
    a central processing unit (CPU) coupled to the intermediate device through the bus and configured to:
        run a virtual machine;
        obtain, by enumerating the intermediate device, first information about the first agent component and second information about the second agent component;
        allocate first address information to the first agent component; and
        allocate second address information to the second agent component, wherein the intermediate device is configured to:
        allocate, by enumerating the network adapter, third address information to the first function component;
        allocate, by enumerating the network adapter, fourth address information to the second function component;
        establish a first correspondence between the first address information and the third address information;
        establish a second correspondence between the second address information and the fourth address information;
        implement a first packet forwarding between the virtual machine and the network adapter according to the first correspondence when the virtual machine uses an SR-IOV technology; and
        implement a second packet forwarding between the virtual machine and the network adapter according to the second correspondence when the virtual machine uses a Virtio technology.

2. The computer device of claim 1, wherein the intermediate device comprises a first endpoint port and is coupled to the CPU through the first endpoint port, and wherein the first endpoint port comprises:
a first switching device comprising a downlink port;
a first sub-endpoint port coupled to the downlink port; and
a second sub-endpoint port coupled to the downlink port, and
wherein the CPU is further configured to:
obtain third information about the first switching device through enumeration;
obtain the first information by enumerating the first sub-endpoint port; and
obtain the second information by enumerating the second sub-endpoint port.

3. The computer device of claim 2, wherein the first switching device is configured to:
receive, from the virtual machine, the first packet; and
select, based on fifth address information in the first packet, the first sub-endpoint port or the second sub-endpoint port to forward the first packet.

4. The computer device of claim 2, wherein the intermediate device is further configured to:
configure the first information in the first sub-endpoint port based on fourth information about the first function component; and
configure the second information in the second sub-endpoint port based on fifth information about the second function component.

5. The computer device of claim 2, wherein the intermediate device comprises a channel controller configured to:
control a forwarding path when the network adapter sends a packet to the virtual machine;
set a first path comprising the first sub-endpoint port for forwarding the packet when the virtual machine uses the SR-IOV technology; and
set a second path comprising the second sub-endpoint port for forwarding the packet when the virtual machine uses the Virtio technology.

6. The computer device of claim 1, wherein the intermediate device comprises a conversion component configured to:
convert, using the Virtio technology, the first packet from the virtual machine into a second packet of a forwarding protocol between the intermediate device and the network adapter; or
convert, using the Virtio technology, a third packet from the network adapter to the virtual machine into a fourth packet supporting a Virtio protocol.

7. The computer device of claim 1, wherein the third address information comprises third bus, device, and function (BDF) information of the first function component and third base address register (BAR) space address information of the first function component, wherein the fourth address information comprises fourth BDF information of the second function component and fourth BAR space address information of the second function component, wherein the first address information comprises first BDF information of the first agent component and first BAR space address information of the first agent component, and wherein the second address information comprises second BDF information of the second agent component and second BAR space address information of the second agent component.

8. The computer device of claim 1, wherein the network adapter is configured to support an SR-IOV function, and wherein the first function component comprises a first physical function or a first virtual function.

9. A packet forwarding method comprising:
obtaining first information about a first function component and second information about a second function component in a network adapter, wherein the first function component and the second function component are a same function component or different function components based on a virtualization technology in the network adapter;
allocating, based on the first information, a first address to the first function component;
allocating, based on the second information, a second address to the second function component;
obtaining first address information of a first agent component and second address information of a second agent component, wherein the first agent component supports a single-root input/output (I/O) virtualization (SR-IOV) technology and is an agent of the first function component, and wherein the second agent component supports a Virtio technology and is an agent of the second function component;
establishing a first correspondence between the first address information and third address information of the first function component;
establishing a second correspondence between the second address information and fourth address information of the second function component;
implementing a first packet forwarding between a virtual machine and the network adapter according to the first correspondence when the virtual machine uses the SR-IOV technology; and
implementing a second packet forwarding between the virtual machine and the network adapter according to the second correspondence when the virtual machine uses the Virtio technology.

10. The packet forwarding method of claim 9, further comprising further obtaining the first information and the second information by enumerating the network adapter.

11. The packet forwarding method of claim 9, further comprising configuring third information about the first agent component in a first sub-endpoint port based on the first information.

12. The packet forwarding method of claim 11, further comprising configuring fourth information about the second agent component in a second sub-endpoint port based on the second information.

13. The packet forwarding method of claim 12, wherein the first address information comprises bus, device, and function (BDF) information of the first agent component and base address register (BAR) space address information of the first agent component.

14. The packet forwarding method of claim 12, wherein the second address information comprises bus, device, and function (BDF) information of the second agent component and base address register (BAR) space address information of the second agent component.

15. The packet forwarding method of claim 12, wherein the third address information comprises bus, device, and function (BDF) information of the first function component and base address register (BAR) space address information of the first function component.

16. The packet forwarding method of claim 12, wherein the fourth address information comprises bus, device, and function (BDF) information of the second function component and base address register (BAR) space address information of the second function component.

17. A computer device comprising:
a bus;

a first central processing unit (CPU) configured to run a first virtual machine coupled to the bus, wherein the first virtual machine is configured to support a single-root input/output (I/O) virtualization (SR-IOV) technology or a Virtio technology;
a network adapter comprising:
  a first function component comprising a first agent component, wherein the first agent component is associated first address information; and
  a second function component comprising a second agent component, wherein the second agent component is associated second address information; and
an intermediate device coupled to the first CPU and the network adapter through the bus and configured to:
  allocate, by enumerating the network adapter, third address information to the first function component;
  allocate, by enumerating the network adapter, fourth address information to the second function component;
  establish a first correspondence between the first address information and the third address information;
  establish a second correspondence between the second address information and the fourth address information;
  receive a first packet from the first virtual machine and forward the first packet to the network adapter according to the first correspondence when the first virtual machine uses the SR-IOV technology; and
  receive a second packet from the network adapter and forward the second packet to the first virtual machine according to the second correspondence when the first virtual machine uses the Virtio technology.

18. The computer device of claim 17, further comprising a second CPU coupled to the intermediate device through the bus and configured to run a second virtual machine, wherein the second virtual machine is configured to support the SR-IOV technology or the Virtio technology, and wherein the intermediate device is further configured to:
  receive a third packet from the second virtual machine; and
  forward the third packet to the network adapter.

19. The computer device of claim 17, further comprising a second CPU coupled to the intermediate device through the bus and runs a second virtual machine, wherein the second virtual machine supports the SR-IOV technology, and wherein the intermediate device is further configured to:
  receive a fourth packet from the network adapter; and
  forward the fourth packet to the second virtual machine.

20. The computer device of claim 19, wherein the intermediate device is further configured to control a forwarding path of the fourth packet to the second virtual machine when the fourth packet is received.

* * * * *